June 26, 1951 F. D. PALMER 2,558,456
BOX MAKING, FILLING, AND CLOSING APPARATUS
Filed April 22, 1948 19 Sheets-Sheet 3

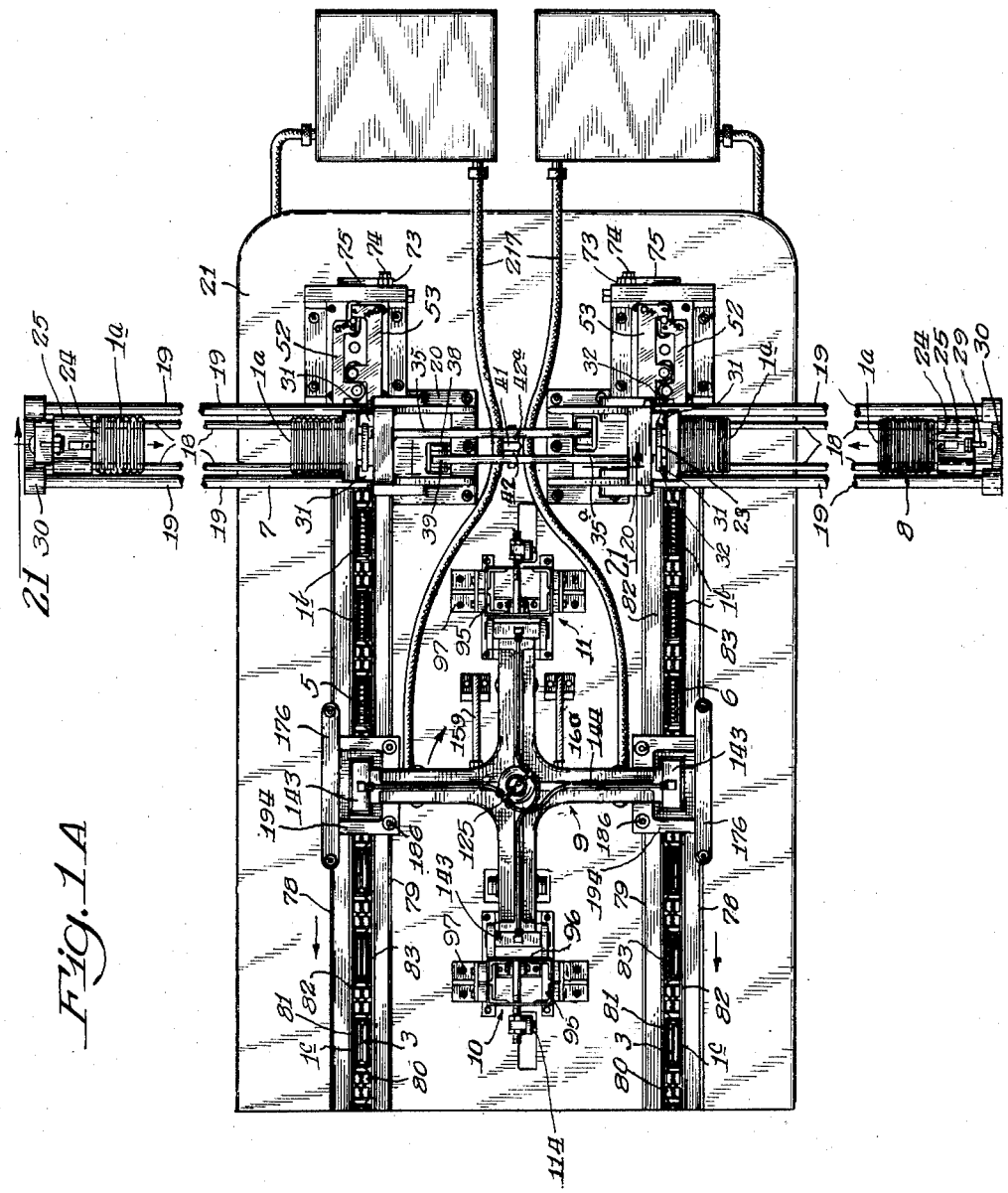

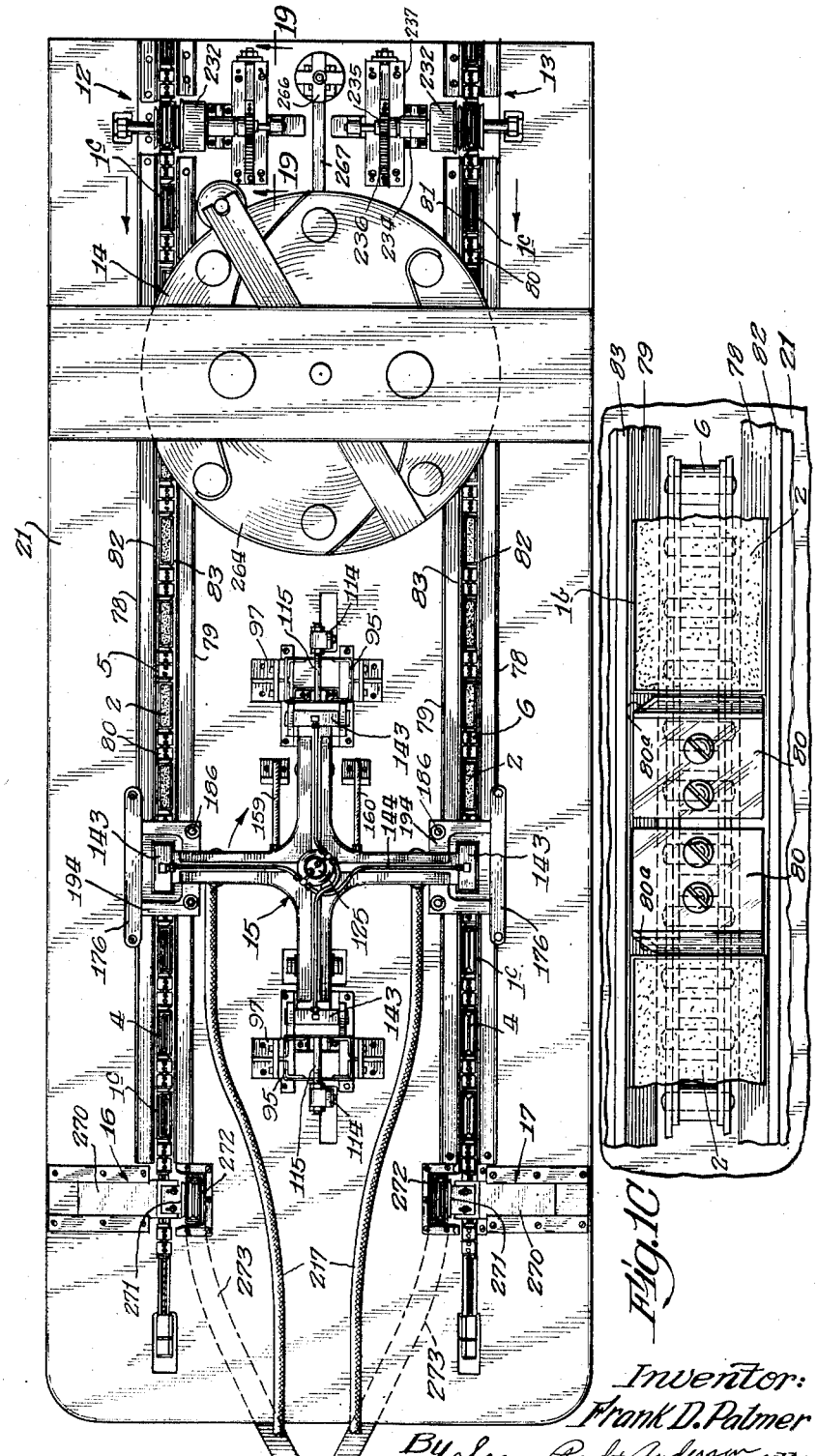

Inventor:
Frank D. Palmer
By Evans, Pond & Anderson
Attys.

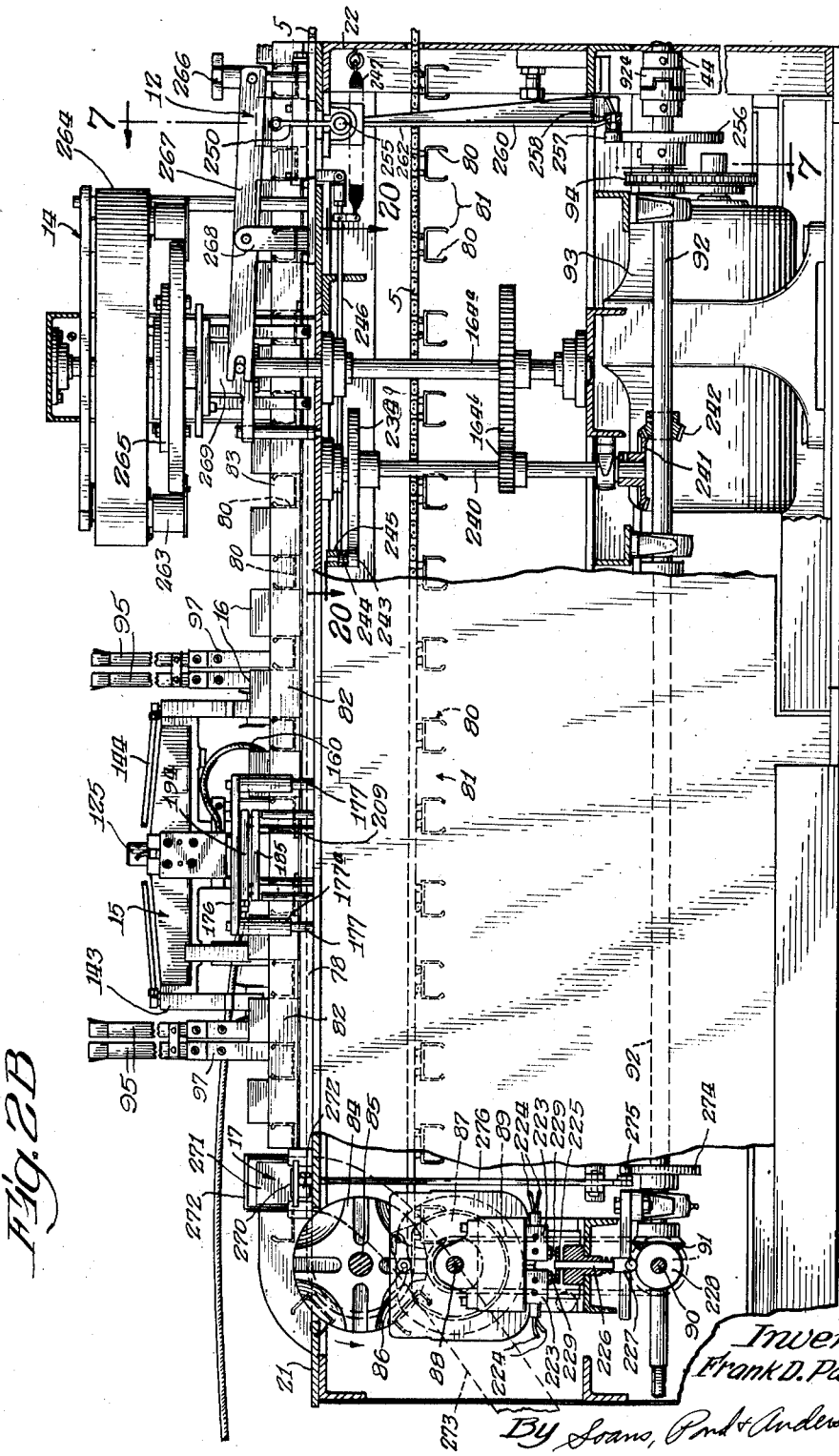

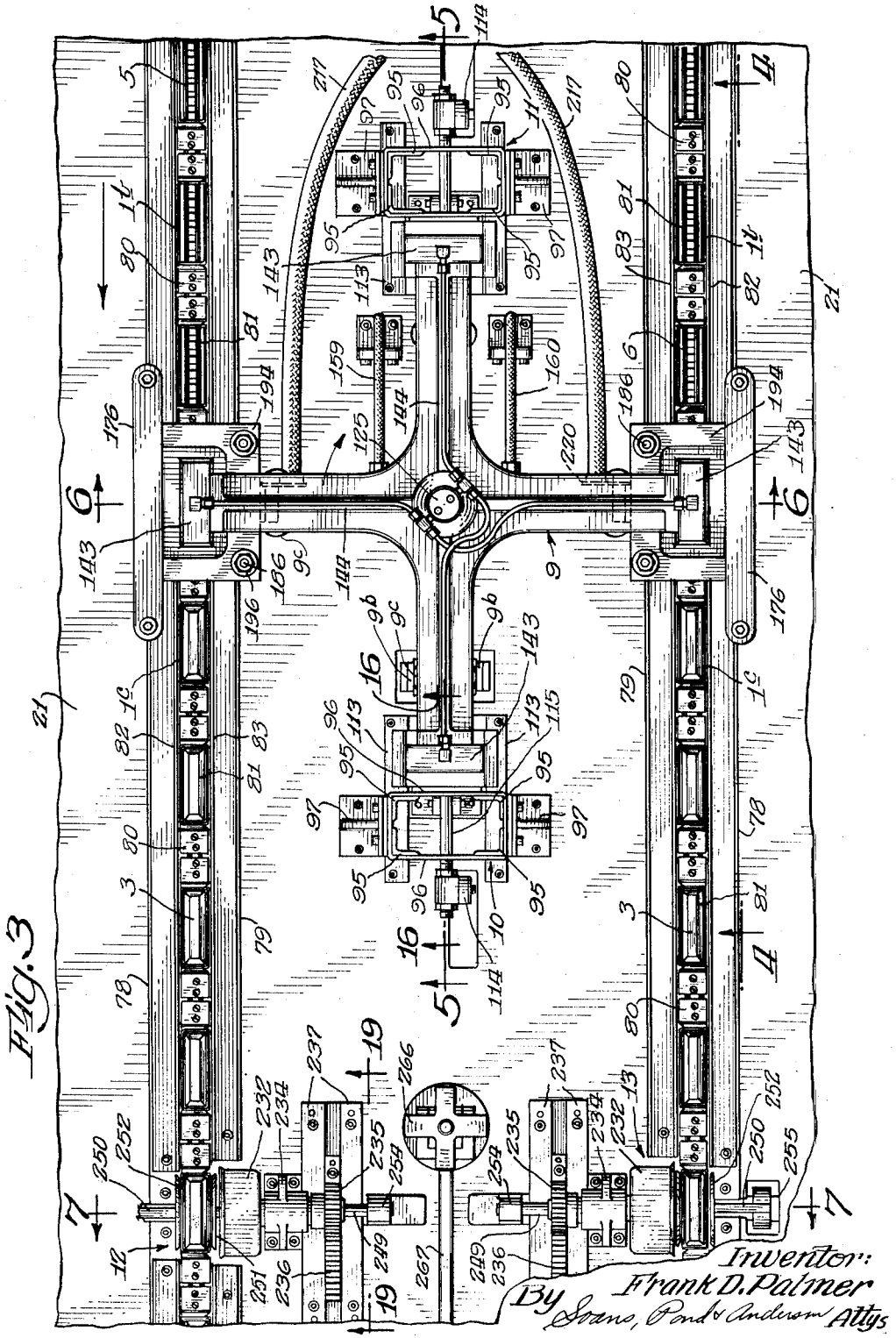

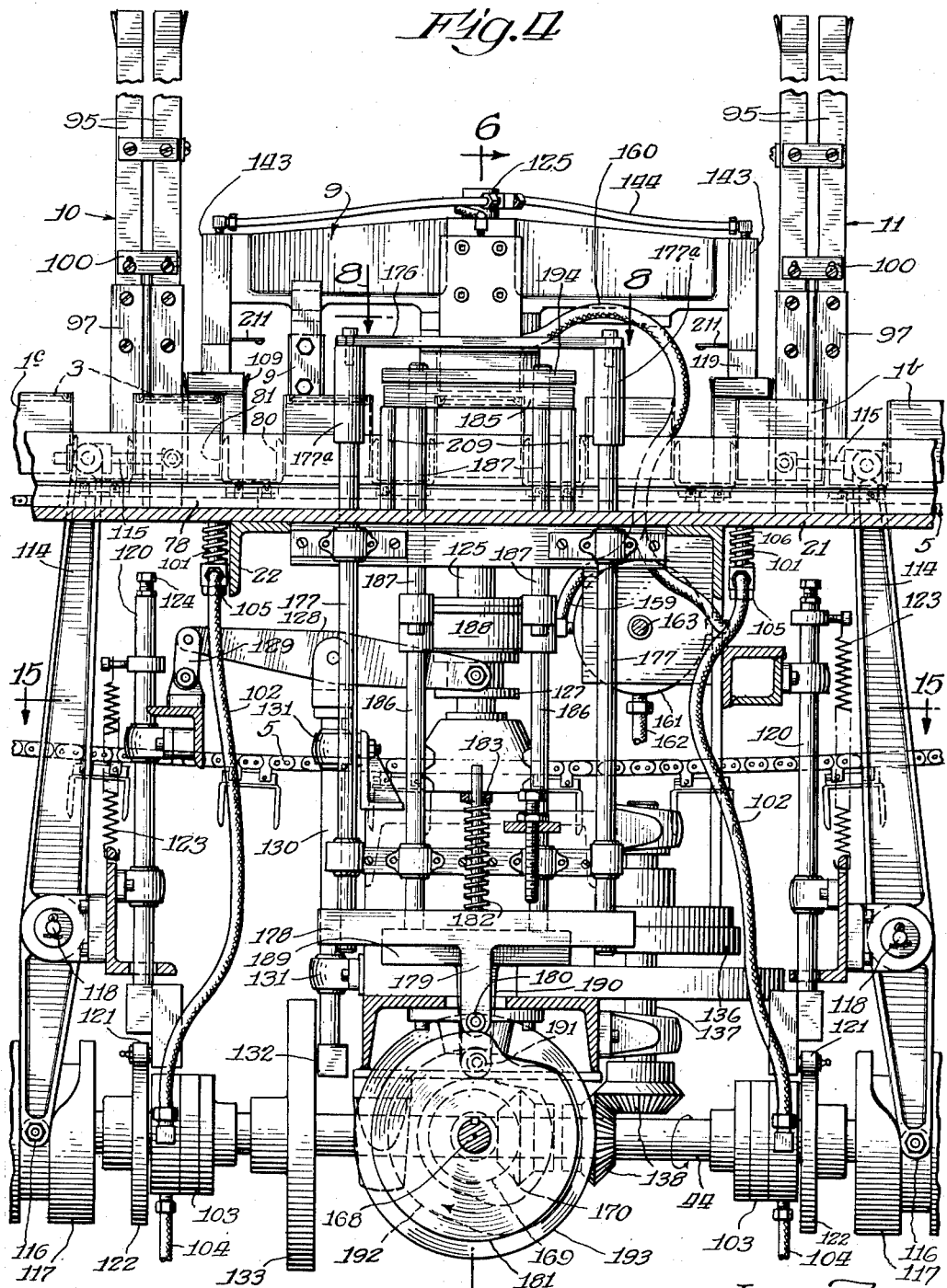

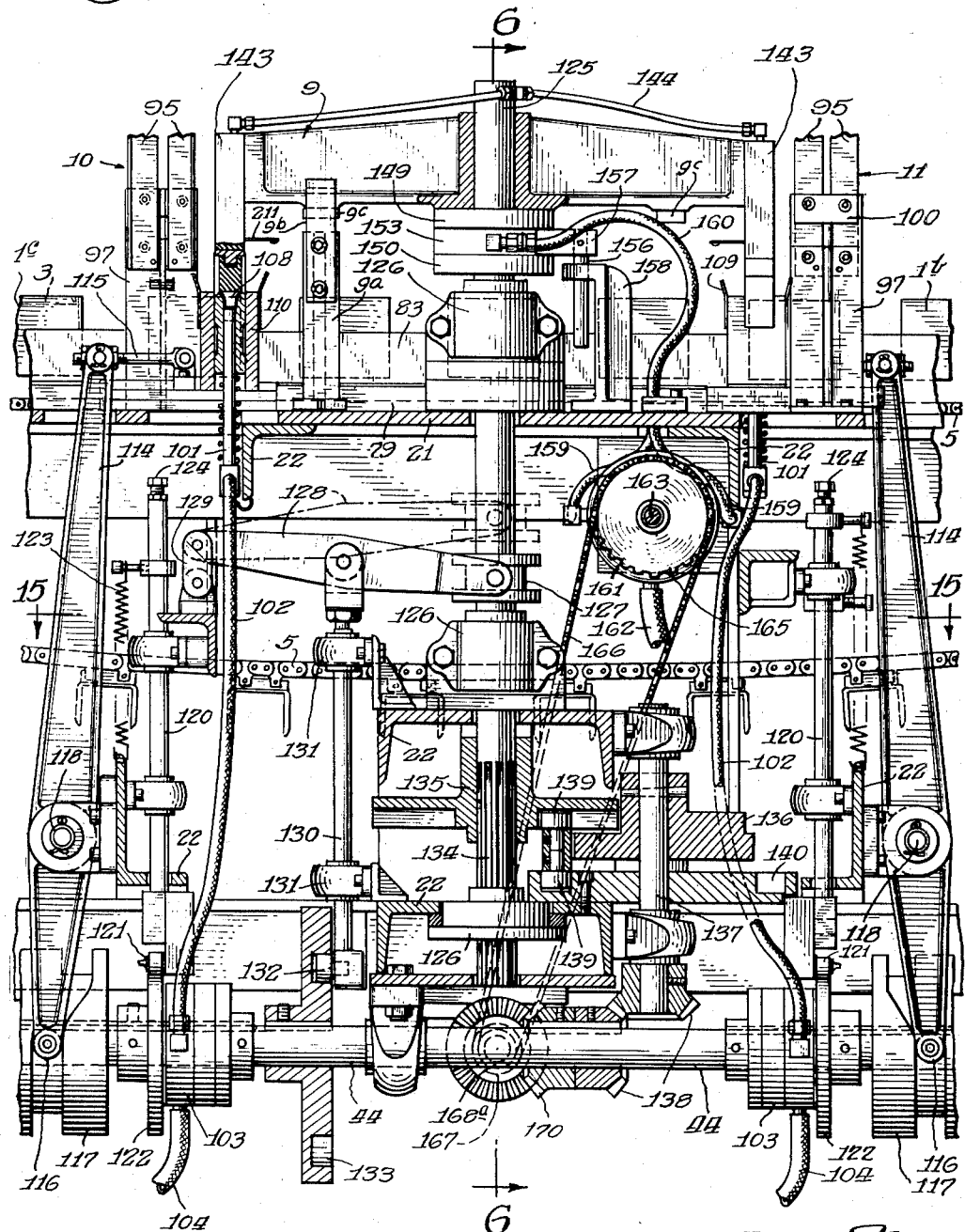

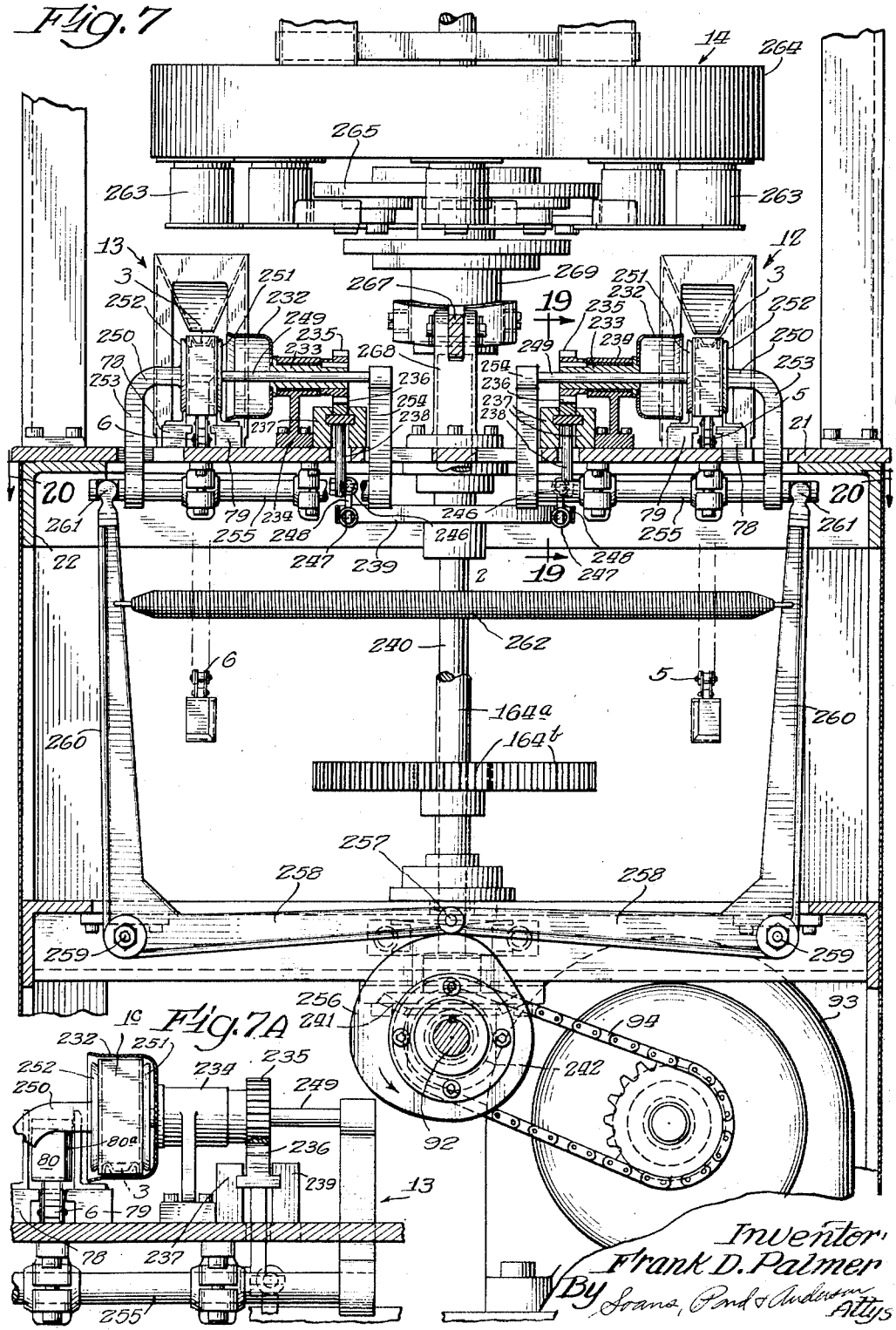

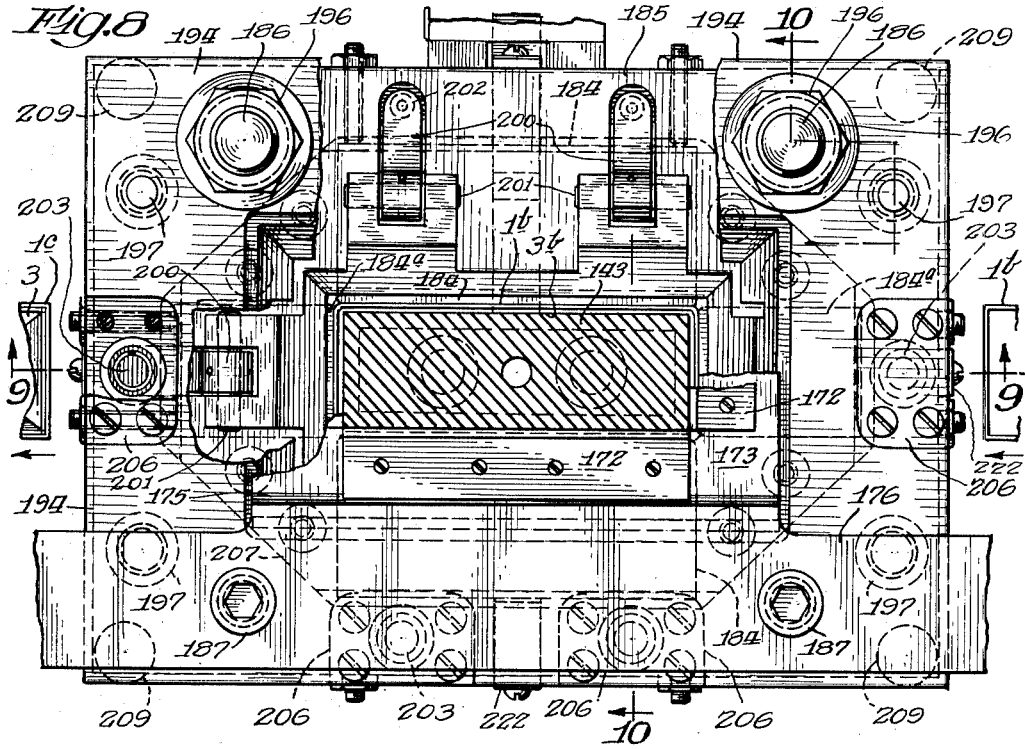

Inventor:
Frank D. Palmer
By Soans, Pond & Anderson Attys

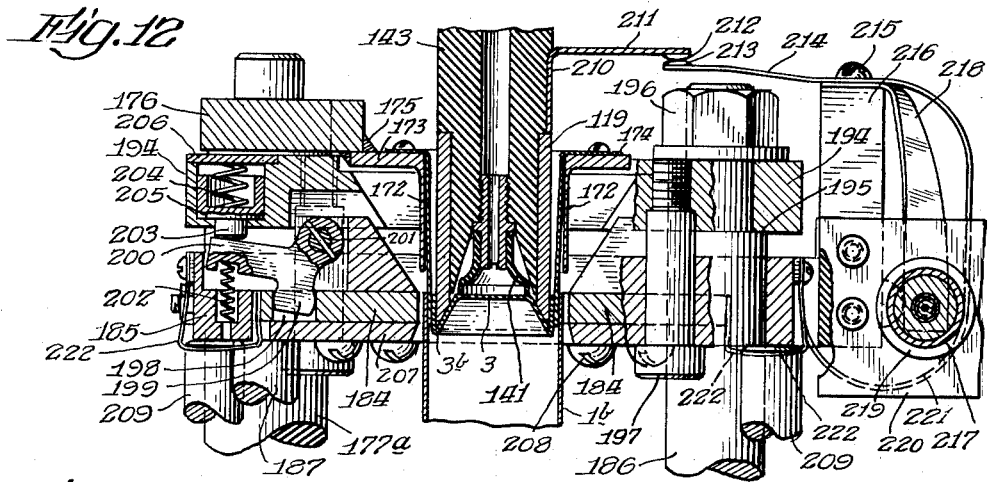
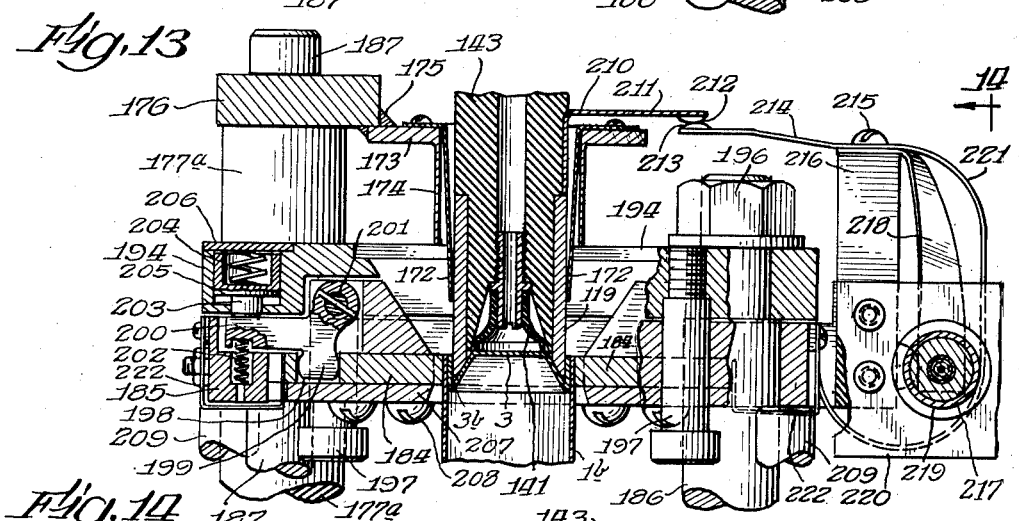
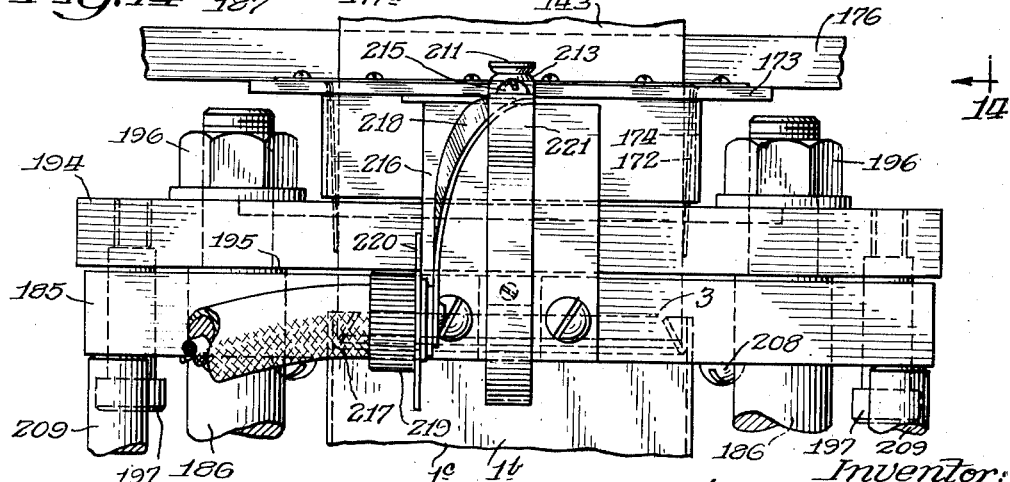

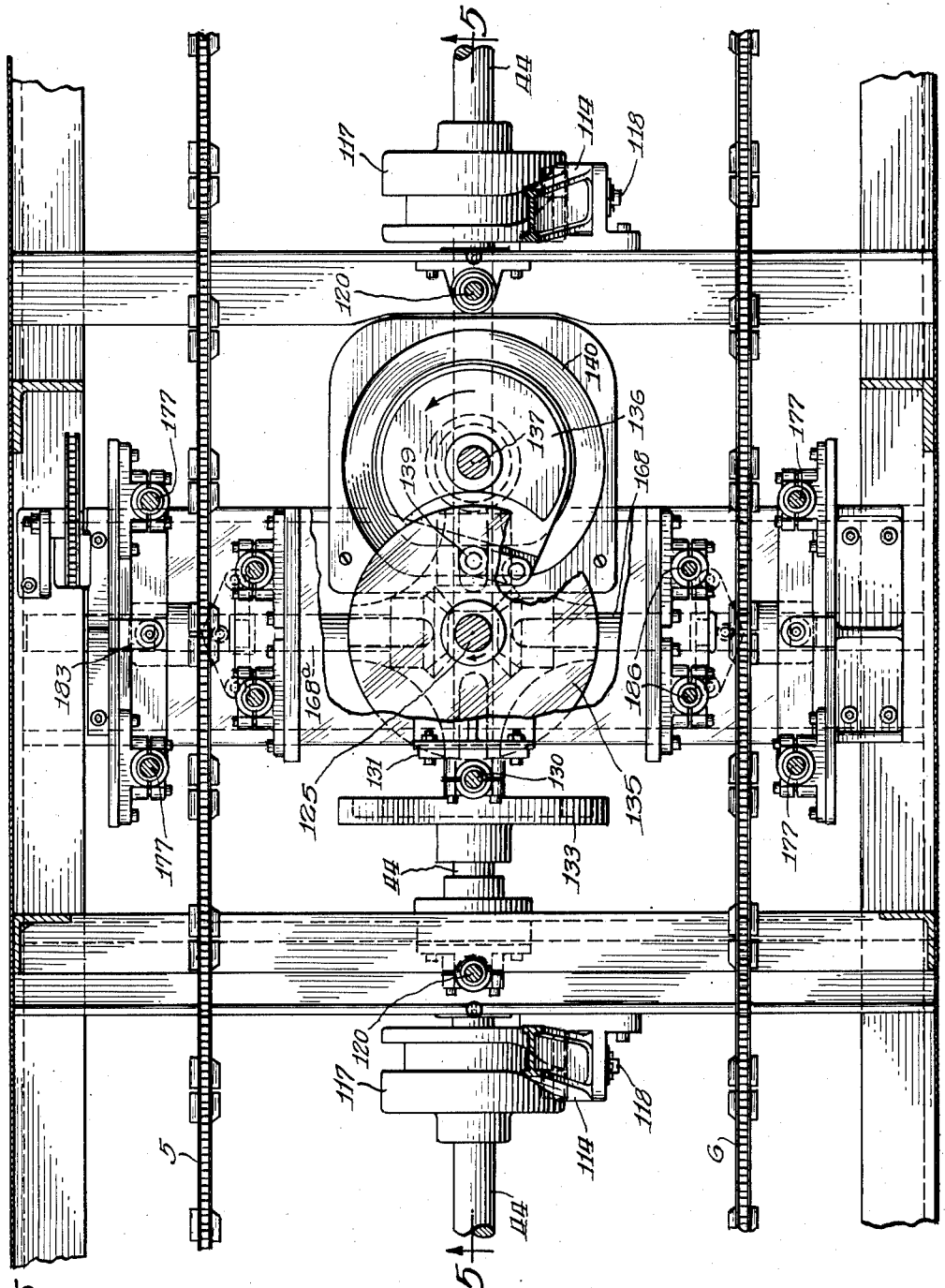

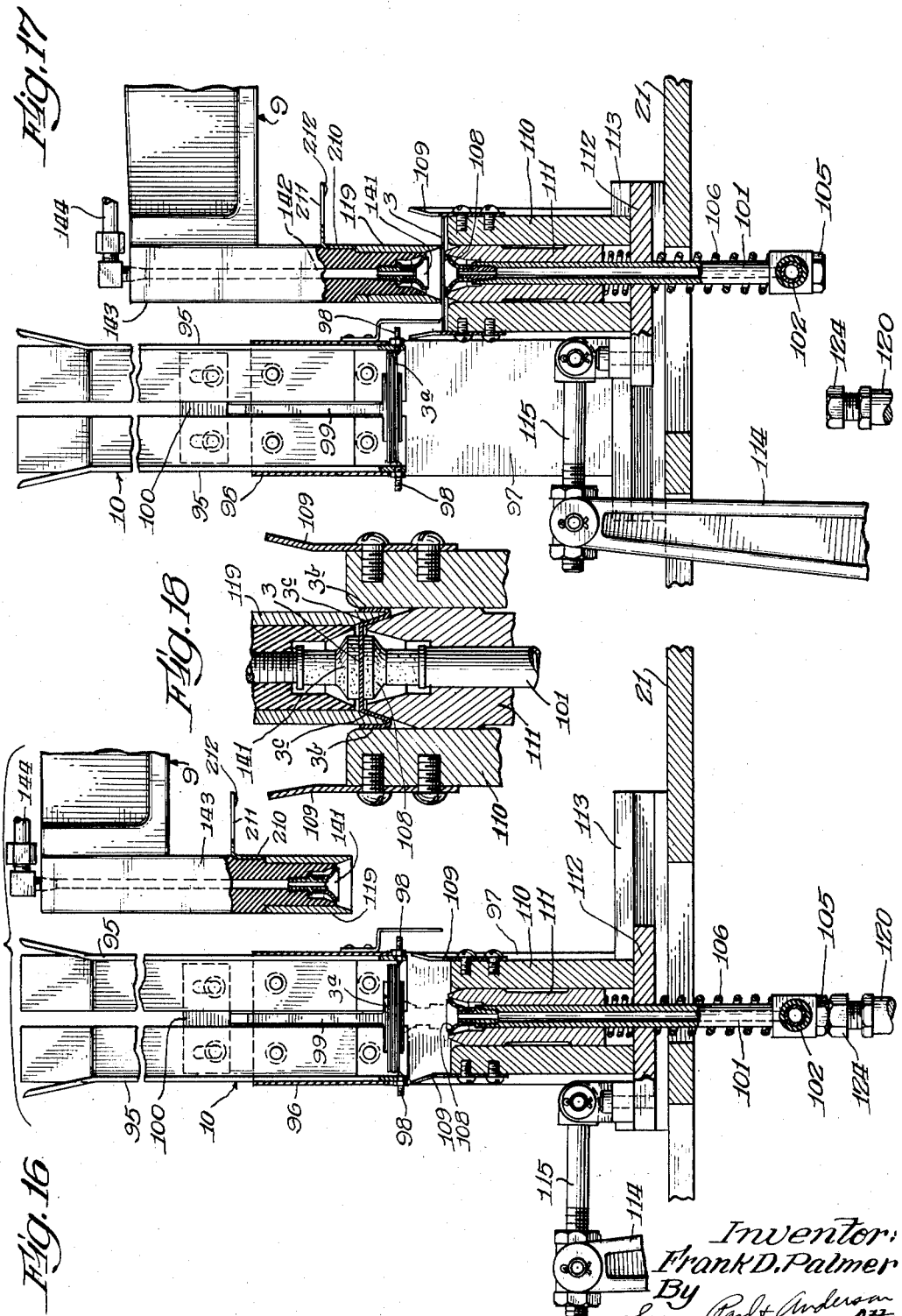

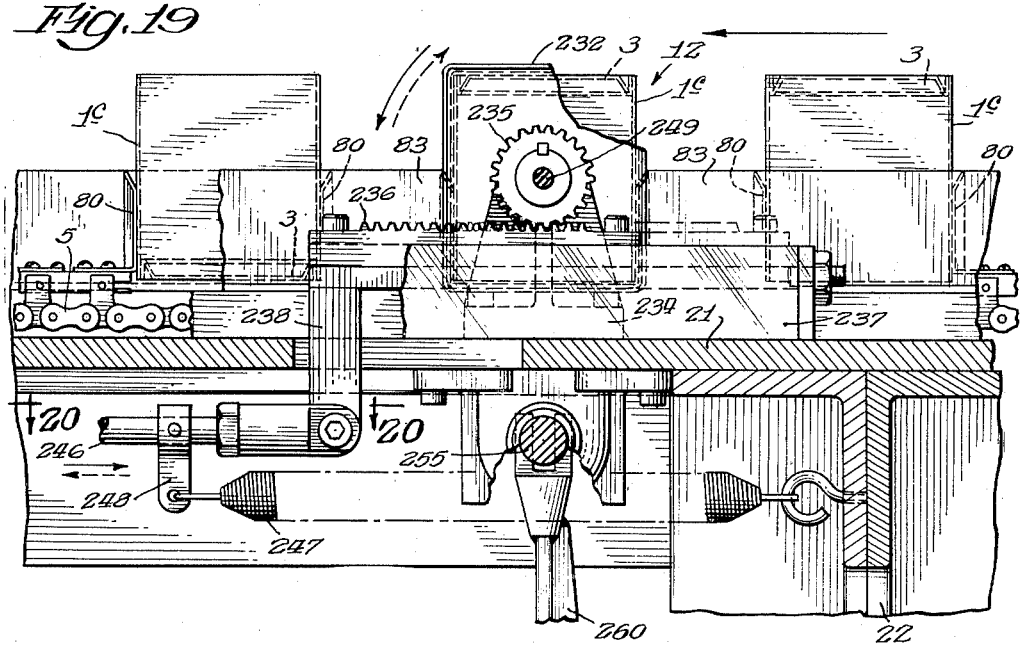
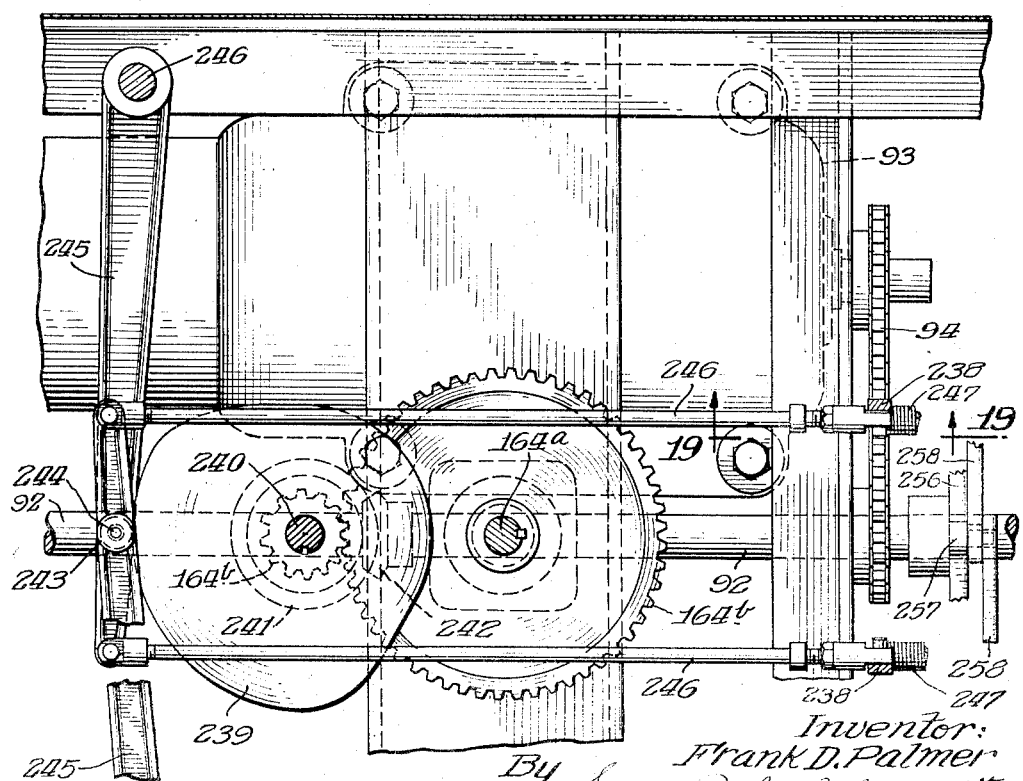

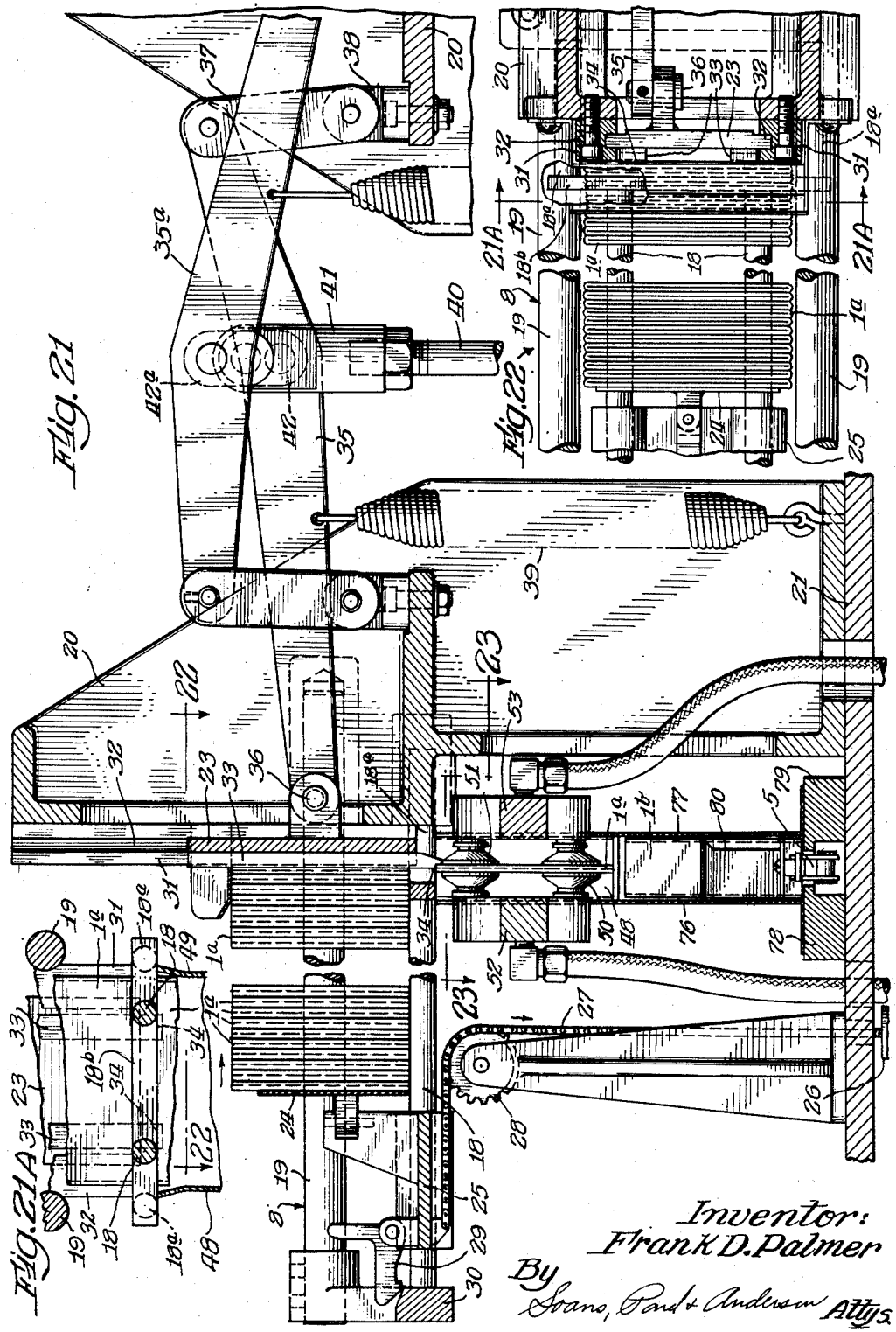

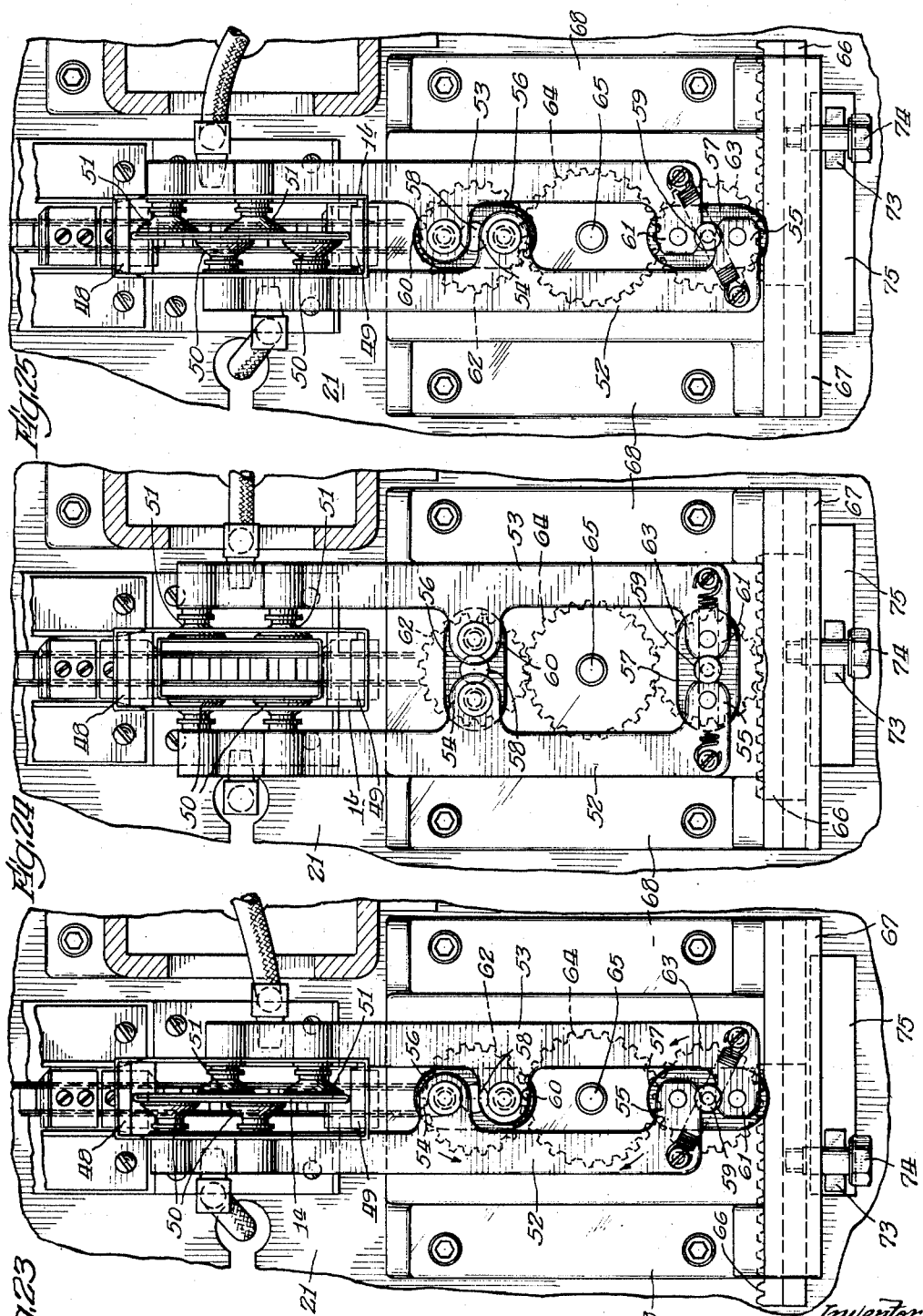

June 26, 1951  F. D. PALMER  2,558,456
BOX MAKING, FILLING, AND CLOSING APPARATUS
Filed April 22, 1948  19 Sheets-Sheet 18

*Fig. 26*

Inventor:
Frank D. Palmer
By Soans, Pond & Anderson Attys

June 26, 1951 F. D. PALMER 2,558,456
BOX MAKING, FILLING, AND CLOSING APPARATUS
Filed April 22, 1948 19 Sheets-Sheet 19
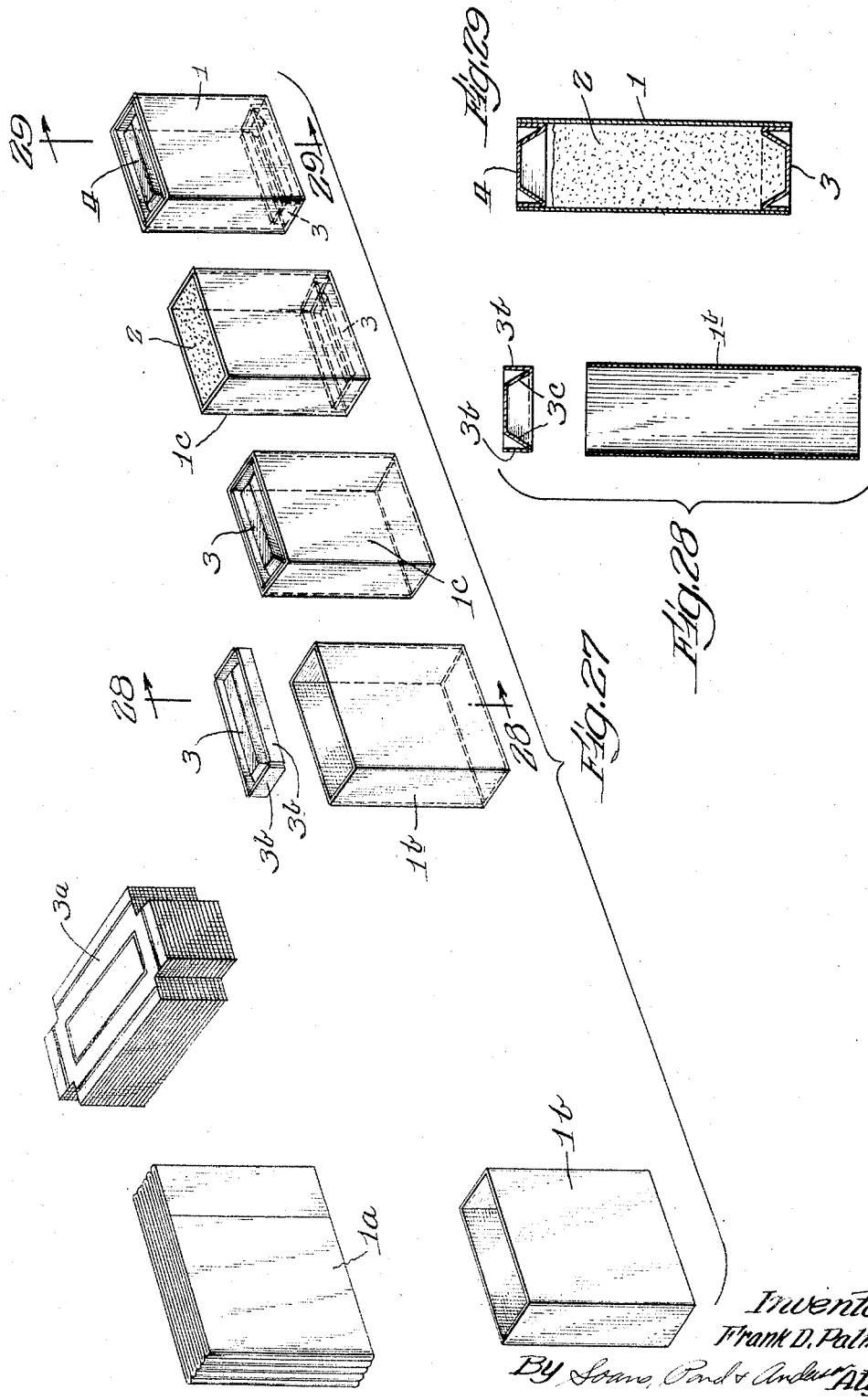
Inventor:
Frank D. Palmer
By Soans, Pond & Anderson Attys Patented June 26, 1951

2,558,456

UNITED STATES PATENT OFFICE 2,558,456

BOX MAKING, FILLING, AND CLOSING APPARATUS

Frank D. Palmer, Chicago, Ill., assignor, by mesne assignments, to Package Machinery Company, East Longmeadow, Mass., a corporation of Massachusetts Application April 22, 1948, Serial No. 22,636

17 Claims. (Cl. 93—55.1)

This invention relates to a method and apparatus for packaging material, the method and apparatus being adapted to the packaging of dry powdered materials, granular materials, and to liquid and semi-liquid materials.

The apparatus, as shown in this application, is supplied with tubular box bodies in collapsed or flattened condition and with stacks of end closure blanks. The apparatus operates to open or distend such bodies in their container forming condition, to form the blanks into flanged end closure form, and insert and seal the same in the opposite ends of the container body, the container being filled before the second end closure is applied.

The main objects of the invention are to provide a continuous process and a continuously operating apparatus for forming or setting up the container bodies, inserting and sealing an end closure in one end of the body, filling the body and then inserting and sealing the other end closure so as to produce a completed package; to provide an apparatus for effectively performing the said functions at a high rate of speed; to provide such apparatus which will be dependable in operation, and which will require a minimum of attention from an operator or maintenance man; and, in general, it is the object of the invention to provide an improved apparatus and method of the character indicated.

Other objects and advantages of the invention will be understood by reference to the following specification and accompanying drawings (19 sheets) wherein there is illustrated the improved method and apparatus embodying a selected form of the improved mechanism.

In the drawings,

Figs. 1A and 1B together constitute a plan view of the machine, Fig. 1A representing the starting end of the machine, and Fig. 1B, the finishing or delivery end of the machine;

Fig. 1C is a fragmentary plan of a portion of the mechanism appearing also in Fig. 1B but on an enlarged scale so as to more clearly show certain details of construction;

Figs. 2A and 2B together constitute a side view of the entire machine, portions being shown in section to reveal certain details and other portions being shown in elevation. Fig. 2A represents the starting portion of the machine, and Fig. 2B, the delivery portion;

Fig. 3 is a top plan of a portion of the mechanism appearing also in Fig. 1A but on an enlarged scale;

Figs. 4, 5, 6 and 7 are sections approximately on planes represented respectively by the lines 4—4, 5—5, 6—6 and 7—7 on Fig. 3. The section plane of Fig. 5 is also shown by the line 5—5 on Figs. 6 and 15; the section plane of Fig. 6 is also shown on Figs. 4 and 5 by the line 6—6, and the section plane of Fig. 7 is also represented approximately by the line 7—7 on Fig. 2B;

Fig. 7A is an illustration of a part of the mechanism appearing in Fig. 7 but on an enlarged scale and showing a changed position;

Fig. 8 is a plan section on a plane approximately represented by the line 8—8 of Fig. 4;

Figure 10:
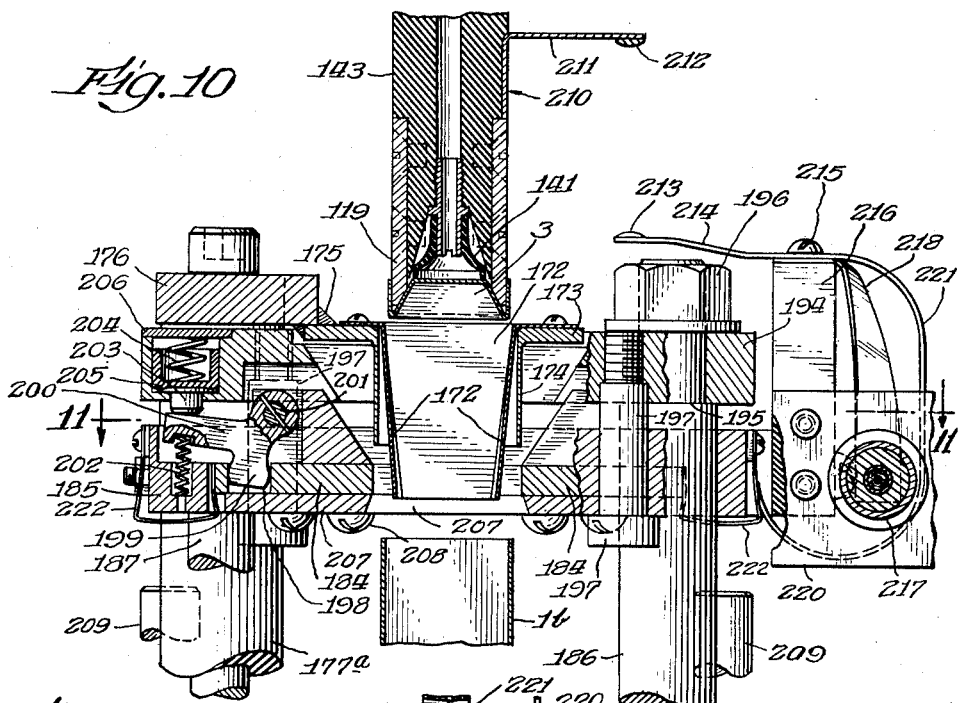
Figure 11:
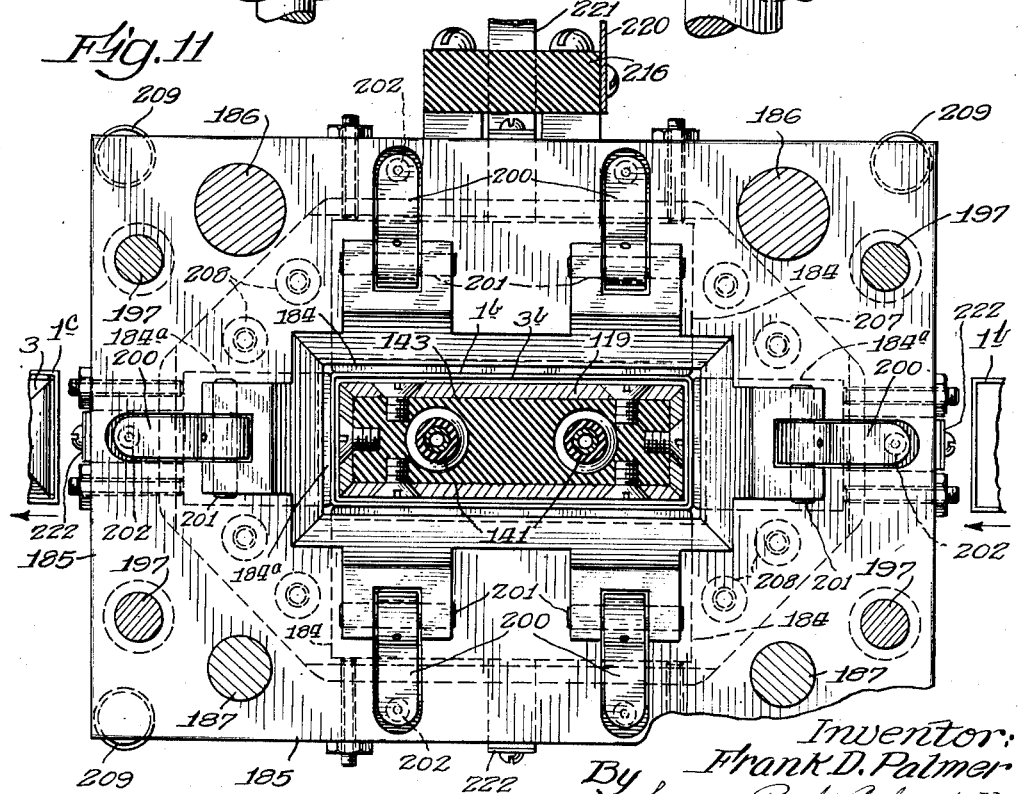

Figs. 9 and 10 are sections on planes approximately represented respectively on lines 9—9 and 10—10 of Fig. 8;

Fig. 11 is a section on the plane approximately represented by the line 11—11 of Figs. 9 and 10;

Figs. 12 and 13 are views corresponding to Fig. 10 but showing successive changed positions of the mechanism;

Fig. 14 is a view on a plane approximately represented by the line 14—14 of Fig. 13;

Fig. 15 is a plan section on the plane represented by the line 15—15 on Figs. 2A, 4, 5 and 6;

Fig. 16 is a section on the plane represented by the line 16—16 of Fig. 3, this view also constituting an enlargement of a part of Fig. 5;

Fig. 17 is a view corresponding to Fig. 16 but showing the parts in a changed position;

Fig. 18 is a view corresponding to a part of Fig. 17 but on an enlarged scale and showing the parts in another position;

Fig. 19 is a section on the plane represented by the line 19—19 on Figs. 1B, 3, 7 and 20;

Fig. 20 is a section on the plane approximately represented by the line 20—20 of Figs. 2B, 7 and 19;

Fig. 21 is a section on the plane represented approximately by the line 21—21 of Fig. 1A;

Fig. 21A is a section on the line 21A—21A of Fig. 21;

Fig. 22 is a section on the plane represented by the line 22—22 of Fig. 21;

Fig. 23 is a section on the plane represented approximately by the line 23—23 of Fig. 21;

Figs. 24 and 25 are sections corresponding respectively to Fig. 23 but showing changed position of the parts represented;

Fig. 26 is a cam timing diagram;

Fig. 27 is a more or less schematic perspective illustration of the steps of operation of the apparatus; and Figs. 28 and 29 are sections respectively on the planes represented by the lines 28—28 and 29—29 of Fig. 27.

General description

Referring first to Figs. 27, 28 and 29 of the drawings, the method and apparatus with which this application is concerned operates to form packages embodying a tubular, paper board body 1 having a charge 2 of powdered or granular material or the like, and inserted paper board end closures 3 and 4.

The tubular bodies 1 are delivered to the machine in the form of collapsed tubes 1a, these collapsed tubes or blanks being supported in a magazine from which they are withdrawn one by one and opened or distended to the tubular body condition represented at 1b. The distended bodies 1b are propelled edgewise in axially vertical position, successively past stations where the end closures are inserted and the container is filled.

At the first station, mechanism operates to withdraw an end closure blank 3a from a magazine supported stack of such blanks and to form it and insert it in the then upper end of the body 1b. The interior of the body 1B or merely the inside surface of marginal end portions thereof, or the outside surfaces of peripheral flange portions 3b of the end closures, are coated with heat sealing material. Heat is suitably applied or generated to reactivate such heat sealing material while pressure is also applied to squeeze the flanges 3b into tight sealing engagement with the inside walls of the tubular body. The tubular body with an end closure secured in its upper end is designated 1c.

The container structure 1c is next inverted to position its closed end at the bottom so as to permit filling of the then open ended container 1c after which the end closure 4 is inserted and sealed by mechanism of the same character that inserts and seals the end closure 3 in the body.

In the present apparatus the mechanism which delivers, forms, inserts and seals the end closures in the containers, and the mechanism which delivers a charge of material into the containers is in the form of rotary apparatus which may conveniently operate on two lines of containers. Hence the present mechanism is a duplex machine in that it operates to produce and deliver two lines of completed packages.

As represented in Figs. 1A and 1B, the machine embodies a pair of relatively independent conveyors 5 and 6, which are simultaneously advanced intermittently or step by step in the same direction. At the right hand end of the apparatus, as illustrated, there are a pair of horizontally disposed magazines 7 and 8 which support stacks of collapsed tubular bodies 1a, which are successively fed one by one to the conveyors 5 and 6 after being distended to the condition represented at 1b, in Fig. 27.

A rotating structure, represented at 9 in its entirety, receives end closure blanks from magazines 10 and 11 which support end closure blanks, such as represented at 3a in Fig. 27. Such end closure blanks, upon being withdrawn from the magazines 10 and 11, are made into the flanged form shown at 3b (Fig. 27) and then inserted in distended container bodies carried by the conveyors 5 and 6 respectively. At the end inserting stations served by the rotary structure 9, the end blanks are also sealed in place by reactivation of the thermoplastic material provided on one or both of the joined elements.

The conveyors 5 and 6 next carry the containers now having one end closed, to stations represented at 12 and 13 (Fig. 1B) where the containers are removed from the conveyors, rotated through an arc of 180 degrees to invert them, and then replaced in the conveyors with the remaining open ends of the containers at their upper ends.

The conveyors 5 and 6 then carry the open ended containers into the zone of operation of filling mechanism indicated in its entirety at 14, which operates to deposit a measured charge of material into the containers. Thereafter the filled containers are carried by the conveyors 5 and 6 into the zone of operation of another rotary end inserting and sealing structure 15, which is substantially a duplicate of the rotary structure 9. The rotary end former, inserter and sealer 15 inserts and seals the end closure after which the packages are discharged from the respective conveyors by discharge mechanisms 16 and 17 respectively. The conveyors 5 and 6 are of like construction and the various operations performed on the container bodies are the same on both conveyors. Hence, the following explanation which refers specifically to operations performed on one of the conveyors will also be applicable to the mechanism which operates in association with the other conveyor.

The container body feeding and distending mechanism

Container body blanks, that is to say, collapsed tubular container bodies 1a, are delivered in a stack to the horizontal magazine 8, the bodies being positioned substantially vertically as best shown in Fig. 21 with their ends at the tops and bottoms of the bodies. They are supported by horizontally disposed bottom rods 18 and guided at their sides by side rods 19, 19. These magazine forming rods 18 and 19 have their inner ends suitably mounted in sockets formed in a bracket 20 which extends upwardly from a top or table plate 21 of the machine, the top plate being supported by a suitable frame structure, the various parts of which are represented at 22 (see Figs. 2A and 2B). The stack of blanks 1a is urged to move toward a feeder plate 23 (Fig. 21) by a follower plate 24 which is carried by a slide 25, the latter being slidably mounted on the rods 18, 18. A weight 26 connected by a chain 27 to the slide 25 and guided around a suitably journaled sprocket 28 serves to urge the follower plate in the body blank feeding direction.

A manually disengageable hook 29 is provided for engaging a portion of a cross head 30 which connects the outer ends of the magazine forming rods 18 and 19. The hook 29 is operative to lock the slide 25 in its out position to facilitate the introduction of a new supply of collapsed carton bodies in the magazine. When they have been placed in the magazine, the hook is disengaged from the member 30 to permit the weight 26 to come into operation.

The body blanks 1a are pressed into engagement with the faces of upstanding guides 31, 31 which are secured to the bracket 20 and suitably slotted as shown at 32 to vertically slidably support the feed plate 23. The feed plate 23 has projecting portions 33 on its outer face which is provided near its lower end with a shoulder 34, said shoulder being adapted to engage the top edge of the adjacent wall of the adjacent body blank 1a. Upon downward movement of the feed plate 23 and its feeders 33, a blank will be forced downwardly from the front end of the magazine stack into position between mechanism which operates to distend the body as will presently be explained.

Vertical reciprocation is imparted to the feed plate 23 by means of a lever 35 which is pivoted at one end as shown at 36, to the feed plate and connected at its other end by means of a link 37 to anchor ear 38 carried by the bracket 20 at the other side of the machine.

A coil spring 39 is stretched between a portion of the lever 35 and an anchor hook carried by a base portion of the bracket 20 and said spring serves to normally urge the lever 35 to move downwardly at its feeder plate end, thereby to move the feeder plate downwardly.

Upward movement is imparted to the feeder plate by means of a rod 40 which is connected by means of a suitable fitting 41 and a short link 42 to the lever 35. The rod 40 also actuates the lever 35a for the feeder at the other side of the machine and the fitting 41 is connected by means of another short link 42a to said lever 35a (see Figs. 21, 1A and 2A).

The lower end of the rod 40 is actuated by a rotating cam 43 carried by a cam shaft 44 which is suitably journaled in the frame structure and driven to cause the cams thereon to perform the various operations which are initiated from said shaft. The rod 40 passes through a suitable opening in the table plate 21 and it is guided at its lower end by means of a link 45, one end of which is connected to the end fitting 46 of the rod 40 and the other end of which link is pivoted (Fig. 6) to a conveniently accessible frame part. The end fitting 46 carries a roller 47 which engages the cam 43. The cam is, of course, so formed that it will actuate the feeders 23 of the respective magazine units in the desired relationship to other operating parts of the apparatus.

The collapsed body 1a moves downwardly in flat condition between side guides 48 and 49 which depend from the bottom of the body blank magazine. Said side guides are spaced a distance corresponding to the edge to edge dimension of the folded blanks as clearly shown in Figs. 21A and 23. To permit passage of the blanks 1a, the bottom rods 18 have end portions 18a offset outwardly as shown in Figs. 21A and 22, said end portions 18a being rigidly connected to the rods 18 by a cross bar 18b.

When the collapsed body blank 1a is moving downwardly, it enters between opposed vacuum cup pairs 50 and 51 which are then spaced sufficiently to permit the blanks to pass freely between said vacuum cup pairs. When the blank reaches its lowermost position under the influence of the downward movement of the feeder, connection is established between the vacuum cup pairs and a source of vacuum so that the opposite side portions of the collapsed body blank are gripped by the vacuum cup pairs. These vacuum cup pairs are then moved away from each other and in an endwise direction into substantial alignment with each other, as shown in Fig. 24, wherein the container body is shown in the distended form as represented at 1b. The movement of the vacuum cup pairs is carried beyond such aligned position so as to effect bending of the container blank to the position illustrated in Fig. 25, thereby to more or less break down the inherent resistance of the container body to being distended and whereby when the container is finally discharged in its distended condition it will have an insignificant tendency to return to its collapsed condition. From the reversely bent collapsed condition shown in Fig. 25, the container body is returned to its normal distended condition, as represented in Fig. 24.

To accomplish the opening, reverse bending and reopening of the container bodies, the vacuum cup pairs 50 and 51 are carried respectively by arms 52 and 53. The arm 52 is provided with a pair of ears 54 and 55 which are respectively pivoted to one end of the short cross arms 56 and 57. The cross arms 56 and 57 are respectively carried by suitably journaled shafts 58 and 59. The arm 53 is similarly provided with ears 60 and 61 which are pivotally connected to the other ends of the said cross arms 56 and 57.

The shafts 58 and 59 are equipped with gear wheels 62 and 63 respectively; and said gear wheels mesh with an intervening gear 64 which is suitably rotatably supported on a shaft 65.

By comparison of Figs. 23, 24 and 25, it will be seen that the vacuum cup pairs are respectively moved through semi-circular paths of travel and that they are moved back and forth for each container body distending operation. Such a movement is imparted to the vacuum cup pairs by rotating the cross arms 56 and 57, 180 degrees forth and back, and this is effected by means of a rack bar 66 which is slidably mounted in guide blocks 67 (see also Fig. 2A) suitably mounted on the machine frame or brackets, such as indicated at 68 which are secured to and extend upwardly from the table plate 21.

The rack bar 66 is reciprocated horizontally by means of a cam 69 on the cam shaft 44. Said cam acts against a roller 70 carried by the free end of one arm 71 of a bell crank which is suitably pivoted, as indicated at 72, on a suitable frame support. The other arm 73 of said bell crank extends upwardly and is pivotally connected as represented at 74, to the rack bar 66. As best indicated in Figs. 23 to 25, the upper end of said bell crank arm 73 is slotted to straddle the pivot pin 74 by which said arm is connected to the rack bar. The upper end of the bell crank arm 73 is movable in a slot 75 provided in the table plate 21.

The cam shaft 44 extends lengthwise of the machine centrally of its width and the cam 69 actuates a pair of opposed bell cranks, the one comprising the arms 71 and 73 just described being one of such pair. The bell crank 71—73 is associated with the container opening mechanism for the conveyor line 6 and the other bell crank of the pair is similarly associated with container opening mechanism which acts on container bodies received from the magazine 7 and delivered to the conveyor 5.

During the unfolding of a container body 1a, the body being unfolded remains in a substantially fixed position vertically. Upon completion of the opening of the container body its lower marginal portion is disposed between the upper ends of a pair of guide plates 76 and 77, which extend downwardly to form a passageway for delivering the distended container body into pockets formed on the underlying conveyor 5 (see Fig. 21).

Said guide plates 76 and 77 are secured at their lower ends to conveyor guide strips 78 and 79 which are, in turn, secured to the table top 21. Owing to the reverse bending of the container body, it exhibits no significant tendency to return to collapsed condition so that the opened container body may be fed downwardly into the conveyor pockets without provision of edge guides. However, suitable edge guides may be provided, if desired.

The container body in distended condition between the opposed vacuum cup arms is fed downwardly as an incident to the downward feed of the next collapsed container body, the lower end of which engages the upper end of the previously distended body so that the collapsed body and the distended body move downwardly as a unit. During such downward movement, the vacuum connection to the vacuum cup grippers is cut off and the grippers remain in an open position so as to avoid any interference with the feed of the distended carton to the conveyor. However, since the distended carton is moved downwardly to the limit of its downward movement under the force of the next fed collapsed container, the conveyor starts to move to carry the distended carton from under a newly delivered collapsed carton body, and the vacuum cup grippers are brought into engagement with the opposite faces of the collapsed body to start their cycle of operation as already described.

The conveyors 5 and 6 which carry the container bodies through the apparatus, comprise suitable chains to which are secured L-shaped members 80, these members being so spaced along the chain that their adjacent vertically disposed legs form between them pockets 81 in which the distended containers are received. The free extremities of the side arms of the members 80 are so bent as to form more or less funnel-like entrances to the pockets 81 to facilitate entrance of the distended containers into the pockets even though they may have partially collapsed during their delivery into the respective pockets.

As soon as the container bodies are inserted in the pockets they are thenceforth held against collapsing inasmuch as they are confined on all four sides, i. e. between opposed legs of the conveyor elements 80 and between the side guides 76 and 77 of the station where the bodies are delivered to the conveyor. During the travel of the container bodies through the mechanism beyond the said station, the container bodies are supported at their opposite sides by means of side guides 82 and 83 which are, in effect, reduced width extensions of the side guides 76 and 77.

The conveyors 5 and 6 are driven step by step by means of suitable Geneva gear mechanism, as represented at the left-hand end of Fig. 2B. Said Geneva gear mechanism includes the usual slotted driven member 84 secured to the shaft 85 which also carries suitable sprockets for driving the conveyor chains 5 and 6. The slotted Geneva motion member 84 is, in turn, driven by the usual crank pin 86 carried by a link pivoted to a suitable disc 87 which is secured to a suitably journaled cross shaft 88. The link which carries the crank pin 86 is controlled by a cam in such a manner that the step by step travel imparted to the conveyors 5 and 6 will be at a nearly uniform rate. The cross shaft 88 is driven by means of a chain diagrammatically represented at 89, which engages suitable sprockets on the shaft 88 and on another cross shaft 90.

The cross shaft 90 is also suitably journaled in frame supported bearings and it is driven by means of intermeshing bevel gears 91 on the shaft 90 and on a drive shaft 92 which extends lengthwise of the apparatus and is suitably journaled in frame supported bearings. The shaft 92 is driven by means of an electric motor 93, or any other suitable source of power, through the agency of a driven chain 94 which engages appropriate sprockets carried by the motor shaft and the said drive shaft 92. Rotation of the shaft 92 is imparted through a suitable coupling 92a to the shaft 44 which is, in effect, an extension of said drive shaft 92.

*Application of first end closure*

Figure 2A:
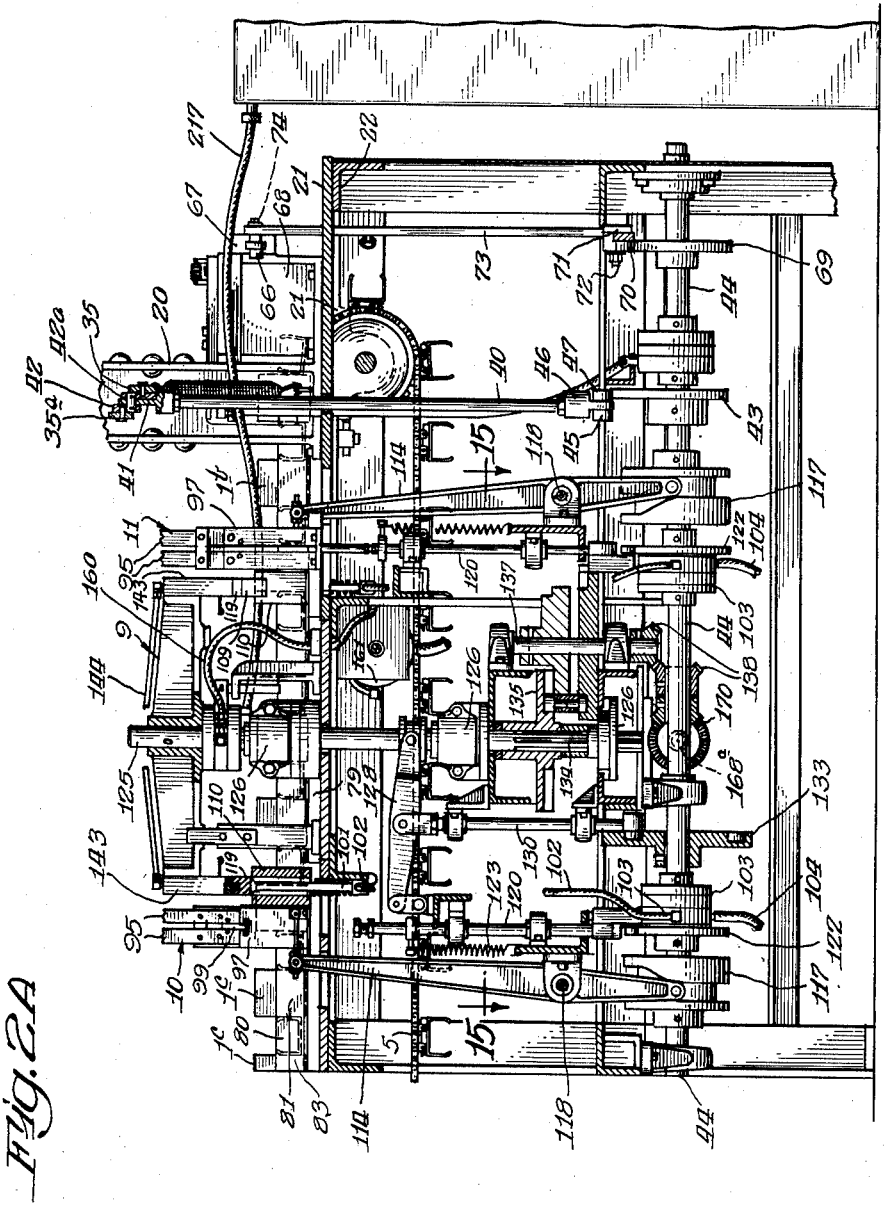

An end closure is first applied to the upper end of the container body by mechanism which includes the rotary structure or carrier 9 and the magazines 10 and 11 (Figures 1a, 2a and 3). Diametrically opposed arms of the rotary carrier 9 are provided at their outer ends with mechanisms which receive end closure blanks from the respectively adjacent magazines 10 and 11. The blanks are subjected to certain forming operations after which the rotary carrier is rotated one-quarter of a turn to deliver the formed blank to a container held in predetermined position by the respective conveyors 5 and 6. The formed end members thus delivered into alignment with containers are next inserted and sealed in place in the upper ends of the containers after which the containers are advanced and other containers brought into position for receiving end closures.

The magazines 10 and 11 are of like construction as are the mechanisms at the ends of each of the four arms of the rotary carrier 9. Hence the following explanation with reference to the magazine 10 and the mechanism at one end of one of the arms 9 will be applicable to the magazine 11 and to the structures at the ends of each of the four carrier arms.

The magazine 10 comprises four angle iron uprights 95 which define a rectangular area adapted to support a vertical stack of end closure blanks 3a, as shown in Fig. 16 (see also Fig. 27). The said angle irons have their lower ends secured in a rectangular band 96 and suitable brackets 97, 97 are secured to opposite side portions of the magazine structure and depend therefrom into engagement with the top plate 21 from which the magazine is supported (see Figures 3 and 16).

The stack 3a of end closure blanks is supported in the magazine by means of a plurality of screws 98, which are threaded through lower end portions of the angle members 95 so as to cause the inner ends of the screws to project into the path of downward movement of the stack of blanks. The screws 98 are, of course, adjustable inwardly and outwardly to adjust their blank supporting effect and to control the ease with which the lowermost blank may be pulled downwardly past the inwardly projecting ends of the pins. Like nuts may be provided on the outer portions of the gears for locking them in selected position of adjustment.

In addition to the inwardly projecting screws 98, which engage the long sides of the blanks, the stack is supported by a pair of spring fingers which engage the opposite ends of the lowermost blanks in the stack. These spring fingers are represented at 99, the same depending from cross bars 100 which are vertically adjustably mounted by screws which pass through slots in the bar, as shown in dotted lines in Figs. 16 and 17.

The lower ends of the spring fingers 99 are widened transversely and provided with shallow transversely extending seats separated by wedgelike ridges which tend to initiate slight separation of the lowermost blank from the overlying blanks. The weight of the stack of blanks is sufficient to cause them to move downwardly past said spring fingers 99 until the lowermost blank comes into engagement with the supporting pins 98, whereby further downward movement of the stack of blanks is prevented.

The lowermost blank in the magazine is withdrawn by vacuum means which, in this instance, consists of a pipe or tube 101 which has its lower end connected by means of a flexible conduit 102 to one port of a valve 103 (see Fig. 5) which has another port connected by means of a flexible conduit 104 to a source of suction or vacuum. The valve 103 is a rotary valve which has a rotatable inner part secured to the driven cam shaft so that the conduit 102 is periodically placed in communication with the suction source in proper timed relation to the requirements of the end closure withdrawing means and operations performed while the end closure remains in the control of the end closure withdrawing means. The connection between the flexible conduit 102 and the pipe 101 is made through the side of a fitting carried by the lower end of the pipe and the lower end thereof is closed by means of a bolt 105 which forms a head for engagement by a vertically movable push rod which periodically raises the tube 101 into engagement with the bottom of the stack of end closures in the magazine. A spring 106 disposed about the tube 101 intermediate said fitting and a plate 112 through which the tube is slidable, serves to effect downward movement of the tube when the push rod is lowered.

The upper end of the tube 101 is provided with a suitable flexible vacuum cup 108 which is adapted to form a substantially air tight connection with the bottom face of the lowermost end closure blank so that when vacuum is applied and the tube 101 is moved downwardly the lowermost end closure blank will be pulled down out of the magazine and deposited within side guides, such as represented at 109 and over the upper end of a forming die body 110. A blank in that position is shown in Fig. 17.

The vacuum pipe 101 is vertically slidable through an inner die member 111, which is in turn vertically slidable within the outer die body 110 which supports the said upstanding members 109. The die body 110 and the parts contained therein are supported on a base or plate 112 which is horizontally slidably mounted in opposed ways or guide strips 113. Said base plate 112 is reciprocated in said guides by means of a cam actuated lever 114 which has its upper end adjustably connected through a link 115 to the base plate 112 and its lower end provided with a roller 116 (Fig. 5) which engages a cam 117 carried by said shaft 44. The cam 117 is suitably formed to rock the lever 114 about its intermediate supporting pivot 118 in predetermined synchronization to horizontally reciprocate the plate 112 and die structure in the required synchronization for the purposes of the apparatus.

After an end closure blank 3 is delivered into position above the upper end of the die block 110, the die block with its contained structure is advanced laterally (to the right in Fig. 16) into alignment with a forming die 119 which is carried at the free end of each of the arms of the rotary carrier 9. This aligned position of the die block 110 is shown in Fig. 17.

Vertical movement is imparted to the suction pipe 101 and its upper end vacuum cup gripper 108 by means of a push rod 120 which is vertically slidably mounted in suitable bearing brackets carried by conveniently accessible frame parts or brackets provided for that purpose (see Figs. 2A, 4 and 5).

The lower end of the push rod has secured to it a roller 121 which engages a rotary cam 122 carried by the shaft 44 which is suitably shaped to move the push rod 120 upwardly and to permit it to be lowered at the proper times. A spring 123 stretched between a portion of the frame structure and part of the push rod serves to resiliently move the push rod downwardly in accordance with movement permitted by the shape of the cam 122. The upper end of the push rod is provided with a vertically adjustable end member 124 which is adapted to engage the end member 105 of the suction tube.

When the die block 110 and its contained parts are moved to the position shown in Fig. 17, the rotary carrier 9 is lowered so as to bring its die member 119 into a cooperative engagement with the lower die structure as will best be understood by reference to Figs. 17 and 18. The lower end of the die element 119 is formed to cooperate with the upper end portion of the inner die element 111 and the inside of the upper end of the die body 110 to effect folding or forming of the end closure blank from its initial flat position to its formed position in which the side flange portions 3b are substantially vertically disposed, these portions being connected to the central panel portion of the formed end closure by means of angularly extending connecting flanges 3c.

The rotary carrier 9 is fixedly secured to axially vertical shaft 125 (see Figs. 2A and 5) which is journaled for rotation in suitable bearings, such as indicated at 126 which are carried by the frame structure of the machine. The shaft is also vertically slidable in said supporting bearings and it is provided with a flanged collar 127, which cooperates with a roller on one end of a lever 128 for the purpose of imparting vertical movement to said shaft and carrier head 9. The other end of the lever 128 is pivotally anchored, as indicated at 129 to a suitable part of the frame structure of the machine, and rocking movement is imparted to said lever by means of a rod 130, which is vertically slidably supported in bearings 131 carried by the framework of the machine. The upper end of said rod 130 is pivoted to the lever 128 as shown, and the lower end of said rod is provided with a cam engaging roller 132, which cooperates with a rotary cam 133 carried by the shaft 44.

The lower end portion of said shaft 125 is suitably splined, as indicated at 134, and said splined portion fits slidably and non-rotatably through the hub part of the driven element 135 of a Geneva movement. The driven member 135 is actuated by means of the driving member 136 of the Geneva movement, said driving member 136 being mounted on a shaft 137 which is suitably journaled and continuously driven from the main shaft 44 through the agency of a pair of inter-meshing bevel gears 138.

The Geneva movement comprising the parts 135 and 136 is of a special type which imparts a substantially constant rate of travel to the driven member 135 regardless of the position of the elements which interconnect the drive and driven members 136 and 135 respectively, which are represented in Fig. 5, by the double ended roller structure 139. The position of said roller structure is varied as required by means of a stationary cam track 140 so as to compensate for changes in the relationship between the roller 139 and the axis of the driven member 135 of the Geneva movement. This type of constant speed Geneva movement drive is well known and therefore is not further described in this application. By means of the Geneva movement the rotary carrier head 9 is periodically advanced one-quarter of a revolution and by means of the cam 133, the rod 130 and the lever 128, the carrier head is raised and lowered as required.

Referring again to Figs. 16, 17 and 18, and also to Figs. 8 to 11 inclusive, it will be seen that the mounting block 143 which carries the die member 119, contains a pair of vacuum grippers 141. These vacuum grippers are connected through suitable ducts 142 in the block 143 through suitable conduits 144 which communicate with suitable ducts 145 and 146 (see Fig. 6) provided in the upper end portion of the shaft 125. The ducts 145 and 146 respectively communicate with annular grooves 147 and 148 in the faces of discs 149 and 150 respectively. The discs 149 and 150 rotate with the carrier 9 and the shaft 125, the disc 149 being pinned as indicated at 151 to the carrier and the disc 150 being secured to the shaft by means of a set screw 152. Intermediate the discs 149 and 150 there is a gland 153 which is provided with passageways 154 and 155, which respectively communicate with the aforesaid annular grooves 147 and 148.

The passageways, ducts and conduits just referred to are employed for the purpose of transmitting vacuum or suction to the gripping cups 141 at the end of each of the rotary carrier arms. During the rotation of the carrier, the gland 153 remains stationary while the grooved discs 149 and 150 rotate, communication being continuously maintained between the respective passageways 154 and 155 and the ducts 145 and 146.

The gland 153 is held against rotation by means of a rod 156 (see Fig. 5) which depends rigidly from an ear 157, which extends laterally from the gland, said rod being vertically slidable in an opening provided in the upper end portion of a bracket 158 which is rigidly secured to the top plate 21 of the machine.

The passageways 154 and 155 in the non-rotating gland 153 are connected by flexible conduits 159 and 160 respectively to diametrically opposed ports of a rotary valve 161. Another conduit 162 connects a third port in the valve 161 to a source of suction or vacuum. The valve 161 is operated so as to alternately establish communication between the source of vacuum and the conduits 159 and 160 and parts connected thereto. In the operations of the machine, vacuum is simultaneously established in the gripping cups 141 of one diametrically opposed pair of arms while vacuum is cut off from the gripping cups in the other diametrically opposed pair of arms. Hence the conduit 159 and the various passages and ducts which communicate therewith, lead to the gripping cups in one opposed pair of arms while the conduit 160 similarly communicates with the gripping cups in the other opposed pair of arms.

The valve 161 is suitably held in place on a shaft 163, which is journaled in bearings 164, 164 (see Fig. 6) which are carried by portions of the machine frame or brackets secured thereto. The shaft 163 has secured to it a part of the valve 161 which, upon being rotated alternately establishes the required communication between the conduit 162 and the conduits 159 and 160. The shaft 163 is provided with a sprocket 165 which is engaged by a chain 166 that is driven by means of a sprocket 167 on a cross shaft 168, which is suitably journaled in the machine. The cross shaft 168 is driven from the main drive shaft 44 by means of inter-meshing bevel gears 169 and 170 on the shafts 168 and 44 respectively. An idler sprocket 171 suitably adjustably mounted on the frame structure is provided for adjusting the tension on the chain 166.

After the end closure element 3 has been formed to the condition illustrated in Fig. 18, the carrier head is elevated, the gripper 141 being then in communication with the source of vacuum so that the formed end closure will be carried upwardly from the forming dies 110 and 111, whereupon the latter are moved laterally to their blank receiving positions under the respective magazines. When the carrier structure is returned to its elevated position, it is rotated one-quarter of a turn by means of the Geneva motion already explained, so as to deliver the formed end closure in vertical alignment with one of the tubular, open ended, container bodies on the conveyor 5 (or on the conveyor 6). The initial position of the formed end closure in alignment with a container body is illustrated in Fig. 10, and successive positions of the parts during insertion and sealing of the formed end closure into the container body are represented in Figs. 12 and 13.

In Fig. 10, the upper portion of a tubular, open ended carton body 1b, is represented, it being understood that this body is supported between adjacent L-shaped members 80 of the conveyor chain 5 and on the top surface of the guide strips 78 and 79, which embrace the chain (see Fig. 21).

As shown in Fig. 10, the formed end closure member 3 is pneumatically held in place on the lower end of the forming die element 119. In addition to being in vertical alignment with the container body 1b, said end closure member is also in vertical alignment with a funnel structure 172. Said funnel structure is lowered into the container body and the formed end closure is then lowered through the funnel and into the end closure whereupon the funnel is withdrawn, leaving the end closure in place in the container body ready for adhesive attachment thereto.

The funnel structure 172 is of thin resilient sheet metal construction, including four downwardly and inwardly inclined side plates which have laterally offset upper end portions screwed or otherwise secured to the top flange 173 of a funnel carrier, which includes a depending rectangular, tube-like part 174 surrounding the resilient side plates of the funnel structure. This funnel carrier is rigidly secured as by welding, indicated at 175 (Fig. 10) to a mounting bar 176.

Figure 6:
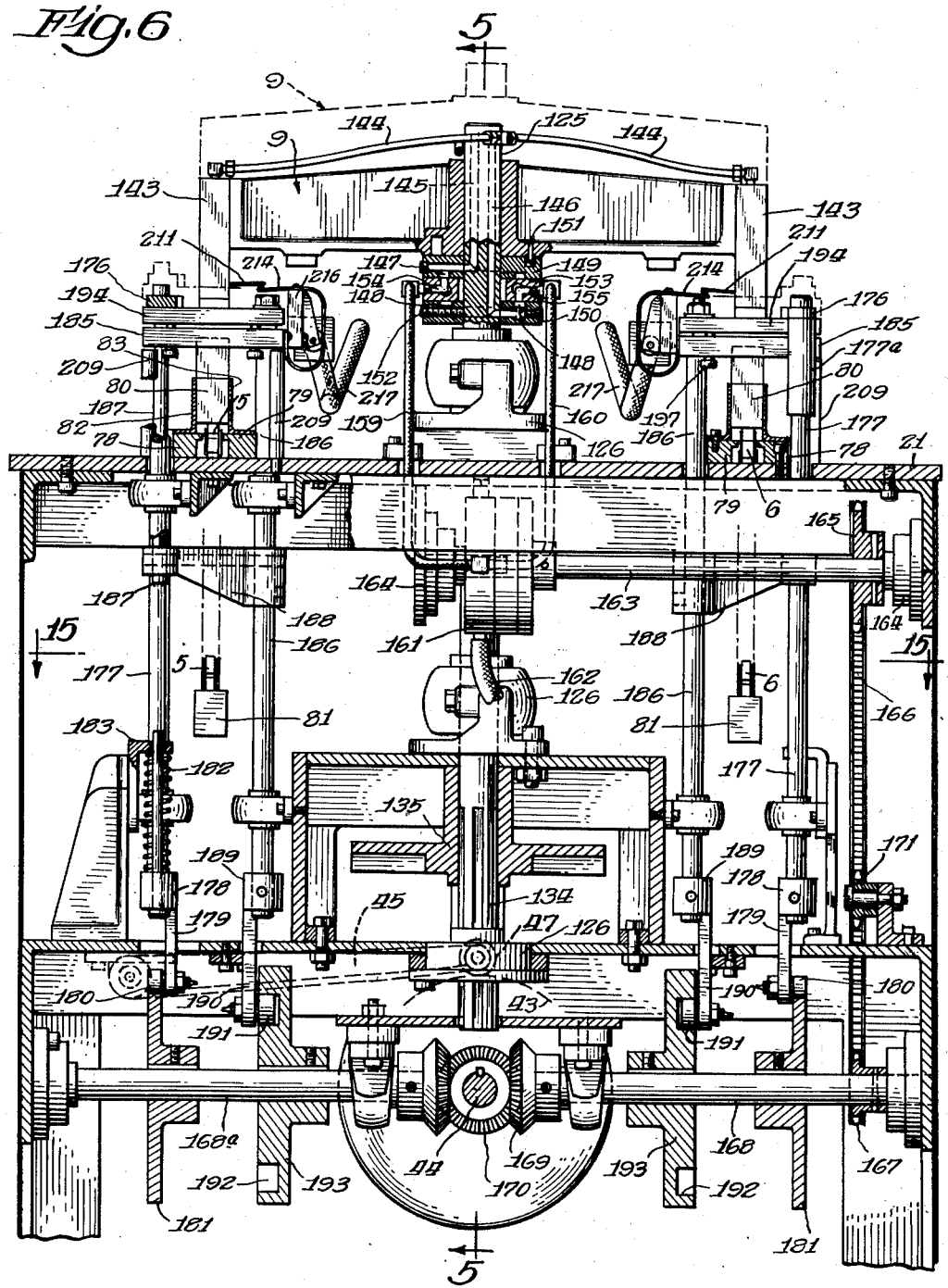

The mounting bar 176 is secured at its ends to the upper ends of vertically slidably mounted posts 177, 177, the lower ends of which are secured to a cross head 178 (see Figs. 4 and 6). The cross head 178 has a depending portion 179, which carries a cam engaging roller 180, which rides on the cam periphery 181 of a cam disc carried by the driven cross shaft 168 coaxially aligned with the shaft 168a.

Electrical insulation sections 177a serve to electrically insulate the cross bar 176 and the metallic parts carried thereby from the posts 177 so that electrical current which is employed, as will hereinafter be explained, does not reach the main body of the machine. A coil spring 182 interposed between the cross head 178 and a portion of a bracket 183 serves to resiliently urge the cross head 178 and the parts secured thereto to move downwardly as permitted by the cam 181.

The end closure carrying head of the rotary carrier and the resilient funnel 172 are simultaneously moved downwardly, the carrier head 143 moving downwardly at a somewhat faster rate than the funnel 172. However, the lower end portion of the funnel 172 enters the upper end portion of the container body 1b before the end closure member on the carrier is lowered sufficiently to spread the funnel plates to such an extent as to interfere with entrance of the funnel into the container body. The funnel structure and the enclosure carrier come to a position, such as illustrated in Fig. 12, which represents the lowermost positions of these parts, and whereupon the funnel structure is retracted or moved upwardly to withdraw the funnel from the container, thereby leaving the end closure 3 in place in the container body with the outer flange portions of the end closure in face to face engagement with the walls of the container body, as shown in Fig. 13. Lowering of the end closure carrier head 143 is, of course, effected by the box cam 133 (Fig. 5) as heretofore explained.

Mechanisms are provided for applying pressure to tightly clamp the container walls against the outer flanges of the end closure when the latter is in the inserted position, as shown in Fig. 13. This clamping mechanism consists (see Figs. 8, 10 and 11) of side clamping jaws 184, 184 and similar but narrower end clamping jaws 184a, 184a, which are horizontally slidably mounted in a carrier 185. This carrier 185 is vertically slidable on vertically extending rods 186, 186 at one side and on supplementary rods 187, 187 at the other side. The jaw carrier plate is supported from an overlying mounting plate 194 by means of shouldered bolts 197 which are screwed into and depend from shouldered bolts 197, the plate 194 fitting slidably through the jaw carrier plate 185 so as to constitute hangers for said carrier plate. The heads of said hanger bolts support the plate 185 in downwardly spaced relation to the overlying mounting plate 194.

The mounting plate 194 (Figs. 8, 10 and 11) is secured to the upper ends of vertically slidably mounted posts 186 between shoulders 195 and nuts 196 so that the plate 194 moves as a unit with the said posts. The posts 187, which are rigid with the posts 186, terminate in engagement with the bottom of the underlying clamping jaw carrying plate 185.

The rods 187, 187 are rigidly connected by brackets 188 to the rods 186 (see Fig. 6). The rods 186 are rigidly interconnected at their lower ends by means of a cross head 189 (Figs. 4 and 6) which has a depending arm 190. The lower end of the arm 190 carries a roller 191 which is received in the cam groove 192 of a rotary box cam 193, which is carried by the shaft 168a. The cam 193, through the described connections, reciprocates the vertical posts 186 and 187.

The jaws 184 (and 184a) are provided with one or more openings, such as represented at 198, into which fit headed ends 199 of small rock levers 200 which are pivotally mounted, as indicated at 201, in the jaw carrier 185. Suitable coil springs 202 are seated in the recesses provided in the carrier 185 and bear against overlying arm portions of the rock levers 200 so as to urge the rock levers to rock about their pivots in such directions as to retract the jaws 184 (and 184a); that is to say, to pull the jaws outwardly.

The overlying mounting plate 194 is provided with suitable plungers 203, which are vertically slidable in the member 194 and normally urged downwardly by suitable coil springs 204 until the shoulders 205 of the plungers seat on the bottom surfaces of the recesses in the plate 194 in which said plungers are positioned. For constructional purposes removable plates, such as indicated at 206, afford access to the plunger receiving recesses and a removable bottom plate 207 secured by screws 208 to the carrier 185 affords access to the jaws 184 and to the ways in which the jaws are slidable.

When the posts 186 and 187 are moved downwardly by the box cam 193, the mounting plate 194 and the jaw carrier 185 move downwardly with the posts as a unit until the jaw carrier 185 comes into engagement with upstanding limiting posts 209 which project upwardly from the table plate. The downward movement of the jaw carrying plate 185 is thereby arrested at a point where the jaws 184 are in horizontal registry with the upper end portions of the container body and end closure flanges substantially as represented in Fig. 12.

Continued downward movement of the mounting plate 194 causes the plungers 203 to bear on the underlying arm portions of the rock levers 200 so as to rock the same in a direction to move the sealing jaws 184 inwardly to the clamping position illustrated in Fig. 13. The cams 193 and 181 (Figs. 4 and 6) which control the movements of the mounting plate 194 and the funnel carrying bar 176, are so formed that at about the time that the jaw carrier 185 reaches its lowered position, as represented in Fig. 12, the funnel carrier 176 is moved upwardly toward the position represented in Fig. 13, thereby to withdraw the funnel plates 172 from between the container body and the outside flanges of the end closure. Hence the continued downward movement of the mounting plate 194 causes the jaws 184 to press the container body walls firmly against the side flanges 3b of the end closure, the latter being supported by the forming die element 119. During the downward movement of the mounting plate 194 relative to the jaw carrier 185, the hanger bolts 197 slide downwardly through the jaw carrier as will be evident from a comparison of Figs. 12 and 13. The spring pressed plunger 203 produces a resilient clamping action, which is not adversely affected by commercial variations in the thickness of the stock employed in producing the end closures and container bodies. Upon completion of the sealing of the end closure to the container body, the parts of the mechanism are, of course, reversely actuated to restore them to the open position shown in Fig. 10.

During the time that the end closure and container body are clamped together, as shown in Fig. 13, a high frequency electrical current is passed from the jaws 184 and 184a, through the container wall, the end closure flange, and to the die member 119, the jaws and said die member being of suitable electrical conducting material.

The head 143 of the rotary carrier, which carries the die member 119 is made of suitable insulating material, for example, synthetic material known as "Lucite" which is a hard and strong synthetic material having suitable electrical and heat resistant properties. Other insulating mediums may, of course, be employed and this particular medium is by no means essential. An electrical contact element 210 is secured to the metallic die element 119 and has a leg 211 extending laterally for a suitable distance. Said leg 211 is provided with a contact element 212 of suitable metal.

When the die head 143—119 is lowered to the position illustrated in Figs. 12 and 13, the contact element 212 engages and makes electrical contact with a similar element 213 on the end portion of a terminal strap 214, which is secured by a screw 215 to a supporting block 216 of insulating material. High frequency electrical current (of the order of 100 megacycles) is conducted from the central terminal of a coaxial cable 217 by means of a suitable conducting strap 218. The shell or outer conductor of the coaxial cable is suitably grounded through the terminal fitting 219 to the machine structure through a bracket 220 in which the end of the coaxial cable is secured.

A tuning band or strap 221 formed as an integral extension of the conductor element 214 extends downwardly and then inwardly, and terminates in a connection to the jaw carrying plate 185. Said tuning band 221 is, of course, made of such length that the electrical circuit will be operative to pass the required high frequency current through the box parts clamped between the inner die member 119 and the jaws 184 and 184a. Each of the jaws 184 and 184a is electrically connected by means of a resilient conductor strap 222 to the adjacent outer edge of the jaw carrying plate 185 so that the transmission of current to said jaws does not depend upon electrical contact between the jaws and the surfaces of the carrier plate on which the jaws slide.

The flow of high frequency electrical current through the box parts between the clamping jaws and the inner die member is controlled by switch means which will presently be described, and not by the making or breaking of contact between the contact elements 212 and 213. It is found that when proper thermo-adhesive material is applied to the end closure flanges, that is to say, adhesive material which has a high resistance to the passage of high frequency electricity, the heating effect of the current will be largely confined to the relatively thin layer of thermo-plastic material. Hence, the box parts themselves will not be heated to such an extent as to create any substantial danger that the box parts may be burned or scorched.

For controlling the flow of the electrical currents through the clamping die structures of the two units of mechanism, there are provided a pair of switches 223, 223 (see Fig. 2B), which control the operation of the high frequency current generator, these switches being connected by leads 224, 224 to such generator. These switches are suitably mounted in fixed position in the framework of the mechanism, and they are simultaneously closed by means of a cross head 225 carried by a vertically slidable mounted pin 226. The pin 226 has a roller carrying head 227 at its lower end and a roller mounted in said head rides on a rotary cam 228. The cam 228 has a rise of very short duration, which serves periodically to elevate the pin 226 and its cross head to thereby press inwardly the switch plungers 229, 229 to close circuits to the generators from which the high frequency currents are supplied respectively to the two sealing units.

The cam actuating switch is represented at 228 in Fig. 26, and the rise of short duration during which the switches are held closed is indicated at 230. It will be seen that the time required for reactivating the thermo-plastic and sealing material is relatively short so that although the thermo-plastic material is reactivated, there is not sufficient time for heat to be developed to scorch or otherwise damage the paper board material of which the box parts are formed.

Also, it will be seen by reference to Fig. 26, that the box cam 192 is so formed that it has a long dwell 231 during which the box parts are held clamped together, this dwell continuing for considerable time after the electrical current is shut off. The length of time during which the box parts are held clamped together is sufficient to permit the thermo-plastic adhesive to again become set so that there is no substantial likelihood that the parts will come apart when the clamping jaws are reopened.

After the reactivated thermo-plastic adhesive has become reset, the jaws 184 and 184a are opened up and the carrier head and the jaw carrying and actuating plates together with the funnel carrier are elevated so as to clear the now closed upper end of the box to permit the latter to be advanced another step when the conveyor carrying the box is again actuated.

When the rotary carrier 9 stops its rotary movement, the closure forming and carrying dies on their ends should be accurately aligned with the forming dies and carton bodies thereunder. The Geneva motion mechanism may so position the rotatably mounted dies but it is preferable that other means be provided for this purpose to additionally insure proper alignment of the cooperating parts upon lowering of the carrier 9. Accordingly, there is provided a vertical guide member 9a (see Fig. 5) having a forked upper end structure 9b adapted to straddle guide blocks 9c mounted on each arm of the carrier 9. This arrangement holds the carrier against rotary movement which may otherwise be permitted incident to looseness or play in the Geneva drive or other parts of the mechanism.

*Container inverting mechanism*

The next step is to invert the container so as to place its closed end at the bottom, thereby to place the container in position to receive a charge of material. Mechanism for inverting the container after the application of one end closure thereto is provided and appears in Figs. 1B, 2B, 3, 7, 7A, 19 and 20 to which reference is now directed.

As seen in the last mentioned figures of the drawings, there is provided for each conveyor 5 and 6, a cup-like receptacle inverting member 232 disposed adjacent but inwardly of the respective conveyors. The outwardly facing cups 232 are axially aligned with predetermined positions of receptacles when the respective conveyors are at rest and mechanism is provided for moving receptacles from the respective conveyors into the respectively adjacent inverting cups whereupon the cups are rotated 180° and the boxes ejected from the cups and returned to their respective places in the conveyors.

The cups 232 are suitably secured to tubular shafts 233 which are rotatably mounted in suitable bearing brackets 234 which are mounted on the table 21 of the machine. The tubular shafts 233 project beyond the inner ends of the respective bearing brackets and they have secured to their projecting ends pinion gears 235 which mesh with horizontally slidable rack bars 236.

Each rack bar is horizontally slidably mounted in ways provided in suitable bars 237, which extend upwardly from the table top 21 and each rack bar has a depending post or finger 238.

The rack bars are reciprocated by cam, lever and spring means to thereby rotate the inverting cups to the extent required. Said cam, lever and spring means comprises a rotary cam 239 mounted on a vertically disposed rotatable supported shaft 240. The shaft 240 is provided with a miter gear 241 at its lower end, which meshes with a complementary miter gear 242 on the drive shaft 92. (Figs. 2B and 7.)

The cam 239 acts against a roller 243 which is carried by a pivot pin 244, which extends through overlapping portions of a pair of horizontally disposed arms 245, 245 (Fig. 20), which have their outer ends pivoted to conveniently accessible frame portions, as indicated at 246. The pivot pin 244, which carries the cam following roller may be permitted a slight amount of movement lengthwise of one of the levers or rock arms 245 so as to avoid locking the same in any one position or, if desired, the pivot pin 246 for either of the arms 245 may be mounted for slight lateral movement to avoid any binding effect. The free ends of the respective arms 245 are connected by links, such as indicated at 246, 246 to the depending posts 238 of the respective rack bars 236; hence, when the cam 239 rocks the arms 245 to the left as viewed in Fig. 20, the rack bars 236 will be correspondingly moved forwardly to thereby impart the required rotation to the inverting cups 232.

Suitable coil springs 247, 247 stretched between anchoring clips, such as 248, secured to the respective links 246 and suitable portions of the stationary frame structure, serve to return the rack bars and to reversely rotate the inverting cups to restore them to their starting positions.

Before rotation is imparted to the inverting cups 232, plunger devices transfer the closed top boxes from the respective conveyors 5 and 6 to the inverting cups. For this purpose there are provided inside and outside transfer plungers 249 and 250 respectively, each being provided with a head plate 251 and 252 respectively, which is adapted to engage the adjacent face of the box. The head plates 251 and 252 of the plungers are normally disposed adjacent the opposite sides of the path of travel of the boxes carried by the conveyors.

When the box is to be transferred from a conveyor into the inverting cup, the plunger 250 is moved transversely of the conveyor and into the mouth of the adjacent inverting cup 232 as shown in Fig. 7A, thereby moving in front of it the box which was positioned in transfer position on the conveyor. During such transfer movement, the box is adequately supported by the legs 80 of the conveyor structure and by the surfaces of the chain guide strips 78 and 79 on which the boxes ride.

The inverting cups 232 are preferably formed with slightly flared mouths, as shown in Figs. 7 and 7A, to facilitate entrance of the receptacles even though there should happen to be some slight error in respect of alignment and even though the receptacle should happen to shift slightly edgewise or endwise incident to the transfer movement. For similar reasons, the conveyor members 80 have their inner side edges flared as indicated at 80a. The plunger heads 251 and 252 move simultaneously and are at all times in the same spaced relationship to each other, which is just sufficient to receive the boxes without actually gripping the boxes. The plungers 250 and 251 which carry the transfer heads are respectively, on horizontally slidably mounted shafts 255, 255, which are located immediately below the table top 21.

The said shafts 255 are actuated by means of a rotary cam 256, which as carried by the drive shaft 92. Said cam acts against a roller 257 which is carried by and is common to the free ends of horizontally extending legs 258, 258 of bell cranks which are pivotally mounted on suitable brackets secured to the frame structure, as indicated at 259. Said bell cranks have vertically extending arms 260, 260 which have their upper ends suitably connected, as indicated at 261, 261, to the outer ends of said slidable shafts 255. Suitable provision is made to avoid locking of the bell cranks incident to their common cam following roller 257 and a coil spring 262 stretched between the bell crank arms 260 serves to yieldingly urge the arms to rock in such a direction that the cam following roller 257 will follow the receding cam surfaces while the plungers 252 are being moved inwardly to transfer boxes from the respective conveyors to the respective inverting cups. The cam 256 is, of course, so timed that it will, at the proper time, permit the spring 262 to effect transfer of boxes from the respective conveyors to the respective box inverting cups 232. Then while the transfer plungers 250 and 251 remain stationary in the inwardly offset position, as shown in Fig. 7A, the inverting cups are rotated 180°. Then while the inverting cups remain stationary, the plungers 251 are moved outwardly to return the inverted box to its original position on the conveyor whereupon travel may again be imparted to the conveyors and the inverting cups 232 rotated 180° back to their starting positions. The conveyors are then again actuated to advance the inverted boxes to filling stations where the material to be packaged is delivered by means of any suitable filling mechanism, such as is generally represented in its entirety at 14.

Filling mechanism

The rotary filling head represented at 14, may be of the character shown in Palmer Patent 2,309,209 or of any other suitable type which is capable of being operated to simultaneously fill two receptacles, one in each conveyor propelled line.

The filling head 14, as shown in said patent, is of such construction that it is adapted to periodically discharge measured quantities of the material being packaged. The required quantities are measured in axially adjustable measuring cups, such as represented at 263. These measuring cups consist of a pair of telescopic tube-like sections, one of which is secured to the pan or hopper 264, and the other of which is secured to and carried by a head 265. Either the hopper 264 or the head 265 may be adjusted vertically relative to the other to change the overall length of the telescopic measuring cup so as to vary the amount of material measured thereby for delivery into a container. In this instance, vertical adjustment of one of the cup section carrying members may be effected by means of a manually rotatable nut or bolt 266, acting on one end of a lever 267 which is pivoted intermediate its ends on a suitable supporting bracket 268 (see Figs. 1B, 2B and 7). The other end of the lever 267 is forked to straddle a hub 269, which may be connected to either of the measuring cup carrying members. The forked end of the lever 267 which straddles the hub 269 is connected to said hub means of a suitable pin and slot connection, as shown in Fig. 2B, so that rocking movement imparted to the lever 267 will be transmitted to said hub part and the measuring cup element connected thereto. With this arrangement, the quantity of material delivered to the receptacles is readily adjustable to permit accurate control of the amount of material delivered into the containers. The hopper 264 or other rotary part of the filling head may be rotated from a vertical shaft 164a which is geared as shown at 164b to the driven shaft 240.

Application of second end closure

After the containers are filled, they are again advanced step by step into the zone of operation of the second end inserting and sealing structure 15, which may be a duplicate of the already described end inserter and sealer, represented in its entirety at 9 in Figs. 1A and 2A. This second end inserter and sealer inserts and seals the end member 4 (Figs. 27 and 29) in the same manner that the first end closure 3 is inserted and sealed, the package is then complete and ready to be discharged from the machine.

Package discharge mechanism

The packages are discharged from the respective conveyors by the discharge mechanism 16 and 17 respectively (Figs. 1B and 2B). These mechanisms are alike except that one is right-hand and the other left-hand. Each includes a horizontally slidable plate 270 equipped with a package engaging pusher head 271 which is operative to engage the outside face of the package and to force it laterally inwardly from the conveyor chain into registry with the mouth 272 of a discharge chute 273. The discharge chutes 273 are of such size that the packages will slide freely downwardly through the chutes and be delivered to a conveyor or into a suitable receptacle as may be desired.

The horizontally slidably mounted discharge plates 270 are reciprocated horizontally in properly timed relation to the intermittent movements of the conveyor by means of a cam, such as represented at 274 on the shaft 92. Said cam 274 acts against a roller 275 which is carried by the free ends of the horizontal arms of a pair of bell cranks, one of which is represented at 276 in Fig. 2B. The upper ends of the vertical arms of such bell cranks are suitably pivotally connected to the sliding discharge plates 270. The bell cranks, such as represented at 276 and the operating cam 274, therefore, are similar to the bell crank arms 258, 260 and the cam 256, shown in Fig. 7.

Summary

The described mechanism, being supplied with collapsed tubular body parts, end closure blanks, and the material to be packaged, operates automatically to set up the container body, form and insert the end closures in the ends of the bodies, seal the end closures in place, and to fill the containers intermediate the application and sealing of the two end closures. The completed packages are then automatically discharged to suitable receiving means.

The containers may, of course, be filled with dry, paste, fluid, or liquid material, filling mechanism suitable for the material to be handled being provided. The details of the containers may also be varied, appropriate changes in sizes and movements of the machine parts being made to accommodate the container to be formed, filled and closed.

The described apparatus is capable of a high packaging rate, notwithstanding its intermittent operating movements, this capacity flowing at least in part from the fact that two lines of containers are simultaneously served. The simultaneous serving of separate lines of containers by end inserters and a filling head which are common to the two lines, simplifies the apparatus and thereby attains low construction cost—due regard being had for the total output capacity of the machine.

Many changes may be made in the described machine while retaining its features and operating principles.

I claim:

1. In apparatus for inserting an end closure member in a container body, means for supporting a distended, tubular container body in axially vertical position, a magazine for supporting a stack of end closure blanks in a position spaced from the position of said distended container body, a vertically movably and pivotally mounted arm having means on its free end for receiving an end closure member, transporting the same into alignment with said container body and inserting the member into such container body, means for withdrawing a blank from said magazine and moving the same into vertically aligned position relative to said end closure receiving means, said transporting means and said end closure positioning means embodying cooperating end closure forming devices operative to form a blank into predetermined end closure forms, end closure gripping means to effect attachment of the formed closure to said receiving means, means for effecting pivotal and vertically downward movement of said arm and receiving means to transport said formed end closure and insertion thereof into said container body as aforesaid.

2. In apparatus for forming an end closure and inserting it into a container body, the combination of means for conveying a succession of open ended container bodies along a predetermined path of travel, a magazine for supporting a stack of end closure blanks, a rotatably and axially movably mounted turret having a plurality of arms, laterally movably mounted means for receiving a blank from said magazine and moving the same into predetermined alignment with the path of travel of the ends of said turret arms, a suction device carried by said laterally movable means for delivering a blank from said magazine into said receiving means, said receiving means embodying also inner and outer blank forming dies, a blank forming die carried by each of said arms and movable as an incident to axial movement of said turret into cooperating relationship to said inner and outer die members of said blank receiving means to shape said blank into the desider end closure form, suction means carried by said turret die member for attaching the formed end closure to the latter whereby, upon axial movement of said turret and its die away from said blank receiver, the formed end closure will be withdrawn from said receiver, means for effecting intermittent rotation of said turret so as to carry an end closure on one arm to predetermined position of alignment with a container body in said succession of container bodies, another arm of said turret being thereby incidentally advanced into cooperative relationship to said magazine and blank receiver, and means for effecting said axial movement of said turret whereby the last mentioned turret arm will be caused to cooperate with said blank receiver to shape another blank into end closure form and the previously shaped end closure will be inserted into the container body with which it is aligned as aforesaid.

3. In apparatus for inserting an end closure into a container body, means for positioning an open ended container body for receiving an end closure, a magazine for supporting a stack of end closure blanks, a blank receiver mounted for lateral movement from a blank receiving position in alignment with said magazine to an offset position clear of said magazine, means for so moving said receiver, suction means carried by said receiver movable therewith and relative thereto when said receiver is in blank receiving alignment with the magazine, means for effecting movement of said suction means to engage a blank in said magazine, withdraw the blank and deliver it to said receiving means, a movably mounted carrier for receiving an end closure from said receiving means and transporting such end closure into aligned position with said container body for insertion thereinto, said carrier being provided with a suction device engageable with an end closure member in said receiving means to thereby attach such end closure member to said carrier for movement as aforesaid into alignment with said container body, and means for effecting movement of said carrier toward said container body to effect insertion of the end closure member into said body.

4. In apparatus for inserting an end closure into a container body, a member for receiving an end closure blank and embodying a relatively fixed outer member and an inner member movable axially of said outer member, a blank forming member movable axially of said receiving member, said forming member and said inner and outer members of the receiver having end portions formed to cooperate with one another to fold marginal portions of the blank into flange position extending at an angle to the normal plane of the end closure, pneumatic gripping means carried by said former for securing the formed closure to said forming member for withdrawal from the receiving member, and means for effecting relative movement of said former and a container body into predetermined alignment with one another and thereafter effecting axial movement of said former and end closure to insert the end closure into said container body.

5. Apparatus, according to claim 4, wherein there is an intermittently rotated turret and a plurality of said formers carried by said turret in laterally spaced relation to each other, and wherein there is a conveyor which is operative to successively hold container bodies in position for successively receiving end closures from the formers of said turret, the arrangement being such that while one of said formers is caused to cooperate with said receiving member, another of said formers is caused to insert a formed end closure into one of said bodies.

6. Apparatus for inserting a flanged end closure into a tubular container body and sealing the flanges of the closure to the body, comprising means for positioning a tubular container body, a member movable into and out of said container body and having an end formed to receive a flanged end closure in cap-like position on one end of the member, means for releasably holding an end closure in said position on the member, means for moving said member endwise into a container body as aforesaid so as to place the flanges of said end closure in face to face relationship to corresponding wall portions of the tubular container body, presser members surrounding said marginal portion of the container body, means for moving said presser members toward the body to thereby press the respective marginal portions thereof firmly into engagement with the flanges of said end closure, said presser members being normally disposed at an elevation above said marginal portion of the container body so as to permit lateral movement of the container body to and from said end closure receiving position, and means for effecting lowering of said presser members into said surrounding relationship to said marginal body portion.

7. In apparatus for inserting a flanged end closure into an end portion of a tubular container body, the combination of a conveyor for propelling a tubular container body laterally to and from a predetermined end closure receiving position, a rotatably and axially movably mounted arm having on its free end a member for receiving a flanged end closure in cap-like position over an end of the member, said member being laterally movable as an incident to rotation of said arm to and from alignment with said end closure receiving position of the container body and being axially movable into and out of an end portion of a container in such position to thereby effect insertion of an end closure into said body, a funnel for guiding said end closure inserting member and end closure thereon into said container body, a support for said funnel movable in the direction of the axis of said container body, means for moving said support and said funnel so as to effect introduction of a portion of said funnel into said container body, means for effecting axial movement of said end closure inserting member through said funnel and into said container body to position said flanged end closure in said container body, said means for moving said funnel support being operative to effect withdrawal of said funnel from said container body while said end closure inserting member remains in said body so as to thereby permit said end closure flanges to engage portions of said container body, presser members movable towards and from said container body to press said portions thereof against the respective flange portions of an end closure positioned in the body on the end of said inserting member, a carrier plate for said presser members movable axially of said container body, said presser members and carrier plate being normally disposed beyond the path of travel of said container body on said conveyor and being moved into said path to position said presser members opposite said portions of said container body, and means for effecting movement of said presser members into pressing engagement with said body portions.

8. Apparatus, according to claim 7, wherein said presser members and the flange engaging portions of said inserting member are formed of electrical conducting material and are connected in a circuit of high frequency electricity when said presser members are moved toward said inserting member, thereby to effect heating of adhesive material intermediate said flanges and marginal body portions.

9. Apparatus, according to claim 8, wherein the presser members and the electrical conducting portions of said inserting member are provided with electrical contact elements which are engaged one with the other when said pressers are moved inwardly to press the body portions against the flaps, said contact elements being separated from each other when said inserting member is moved axially out of the container body to a position clear of said body so as to permit movement of said inserting member from end closure inserting position to an end closure receiving position spaced laterally from said end closure inserting position.

10. Apparatus, according to claim 7, wherein the end closure inserting member is provided with pneumatic means for releasably holding an end closure in cap-like position on said inserting member, and wherein there is provided means for energizing and de-energizing said pneumatic means at predetermined intervals for securing an end closure member in place on said inserting member and releasing said end closure member from said inserting member when the end closure has been applied to the container body.

11. Apparatus, according to claim 7, wherein there is a supporting plate from which the presser member carrier plate is suspended in normally spaced relation to said supporting plate, and wherein said supporting plate is movable axially of a container body in said end closure receiving position, means for limiting the movement of said carrier plate axially of said container body to position said pressers opposite to the end closure flange engaging portions of the container body while permitting continued movement of said supporting plate, and wherein the movement of the presser members into engagement with the container body is effected as an incident to the continued movement of said supporting plate, and means for actuating said supporting plate.

12. Apparatus for inserting a flanged end closure into a marginal portion of a tubular container body, comprising a conveyor for horizontally moving an axially vertical tubular container body to and from end closure receiving position with the closure receiving end of the body at its upper end, means for releasably holding and positioning a flanged end closure in vertical alignment with a tubular body in said closure receiving position, a funnel structure normally disposed intermediate the upper end of said container body and the position of an end closure aligned with said body, means for effecting downward movement of said funnel into the upper end portion of said body and of said end closure positioning means downwardly through said funnel so as to position the end closure within said funnel and the upper marginal portion of said body, said funnel moving means being operative to effect withdrawal of said funnel from the body so as to permit the flanges of said end closure to assume face to face contact with the inside of said body margin, a plate surrounding said funnel structure and movable vertically relative thereto toward and from the upper end of said container body, a jaw carrier suspended from said plate so as to be relatively movable toward and from said plate, jaws horizontally slidably mounted on said carrier for movement into pressing engagement with the outside of the container body opposite said end closure flanges, said plate and jaw carrier being also normally disposed intermediate the upper end of said container body and end closure positioned in vertical alignment with the body, means for effecting downward movement of said plate and carrier to position said jaws opposite the flange engaging portions of said container body, means for stopping the downward movement of said carrier while continuing downward movement of said plate, means actuated as an incident to said continued downward movement of the plate for moving said jaws into pressing engagement with said marginal portion of the body, and electrical connections between said jaws and said end closure positioning means for facilitating the passage of a high frequency electrical current through the pressed together margins of the container body and end closure flanges to effect heating of adhesive material carried by one or both of the interengaging faces of said flanges and container margin, the means for moving said end closure positioning means and jaw carrier into operative relation to the upper end of said container body being also operative to return said parts to position intermediate said end closure positioning member and container body to thereby permit said end closure positioning member to move laterally from said end closure inserting position and said container body to also move laterally out of said end closure receiving position.

13. In apparatus of the class described, the combination of means for holding a tubular container body in axially vertical position with an open end at the top of the body, a head for carrying and positioning a flanged end closure in axial alignment with said body, means for lowering said head and end closure thereon into the upper end portion of said body to thereby position the flanged end closure in the body, horizontally slidable jaws mounted for movement toward and from the upper marginal portion of said body and operative in cooperation with said end closure carrying head to clamp together the flanges of said end closure and the upper marginal portion of said body and electrical connections between said end closure carrying member and said jaws for conducting a high frequency electrical current and passing the same through said clamped together end closure flanges and body margin to thereby heat adhesive material interposed between said flanges and the margin, said electrical connections including a fixedly mounted tuning strap connected at one end to said jaws and having its other end adapted to be connected to a source of high frequency electrical current, said other end being also provided with an extension constituting a terminal, said end closure carrying head being also provided with a contact element adapted to engage said terminal when the head is lowered to end closure inserting position, said contact and terminal being disengageable as an incident to withdrawal of the end closure inserting head from said container body.

14. Apparatus according to claim 6, wherein there is provided means for passing a high frequency electrical current through the interengaging portions of the inserted end closure and container body walls to thereby heat adhesive material interposed between said flanges and body walls, and wherein there is provided cam actuated switch means, said cam actuated switch means being synchronized with the end closure inserting mechanism to effect the flow of said high frequency current for a limited period while the end closure inserting mechanism holds the end closure and container body in assembled relation.

15. In packaging apparatus of the class described, the combination of a pair of horizontally spaced but parallel conveyors, means for effecting step by step movement of said conveyors to thereby effect step by step travel of tubular container bodies positioned on said conveyors, a head mounted intermediate said conveyors for horizontal rotation and vertical reciprocation, means for effecting step by step rotation of said head, said head having a plurality of oppositely extending arms provided at their free ends with end closure gripping means, means for delivering end closures to an opposed pair of said gripping means disposed intermediate said conveyors, said end closures being so delivered during a period of rest of said head whereby the head is subsequently operative to simultaneously carry such end closures from said receiving positions into positions over container bodies on said conveyors and in vertical alignment therewith, and means for effecting reciprocatory movement of said head to thereby effect insertion of said end closures into said container bodies as an incident to lowering of the head and withdrawal of said gripping means from the container bodies as an incident to upward movement of the head.

16. Apparatus, according to claim 15, wherein the means for delivering end closures to said gripping means comprises a pair of magazines for respectively holding stacks of end closure blanks, a pair of devices respectively associated with said magazines and movable horizontally from positions under said magazines to position spaced laterally from said magazines, pneumatic means carried by said devices for gripping the lowermost end closure blank in the overlying magazine, withdrawing the blank therefrom and delivering it to said device, said devices when in their offset position relative to said magazines, being disposed in vertical alignment with the opposed grippers of said head, and said grippers embodying pneumatic means operative to engage and grip the blanks in the respective devices as an incident to downward movement of said head during which end closure members theretofore delivered to other opposed grippers are being inserted in container bodies on said conveyors.

17. Apparatus for inserting a flanged end closure into a tubular container body and sealing the flanges of the closure to the body, comprising means for positioning a tubular container body, a member movable into and out of said container body and having an end formed to receive a flanged end closure in cap-like position on one end of the member, means for releasably holding an end closure in said position on the member, means for moving said member endwise into a container body as aforesaid so as to place the flanges of said end closure in face to face relationship to corresponding wall portions of the tubular container body, presser members surrounding said marginal portion of the container body, means for moving said presser members toward the body to thereby press the respective marginal portions thereof firmly into engagement with the flanges of said end closure, said presser members and the portions of said end closure inserting member which engage the end closure flanges being conductors of high frequency electrical current and connected to a source of high frequency electrical current for effecting heat treatment of adhesive material intermediate said flanges and marginal body portions, said end closure inserting member being mounted for movement laterally to and from alignment with the container body in addition to said movement into and out of said body and comprising a block of electrical insulation material having mounted thereon said end closure flange engaging elements, and terminal elements respectively connected to said flange engaging elements and said presser members, said terminal elements being interengageable when the end closure inserting member is in end closure inserting position within the container body but otherwise separated from each other to permit lateral movement of said inserting member to and from operative alignment with a container in end closure receiving position.

FRANK D. PALMER.

REFERENCES CITED

The following references are of record in the file of this patent:

UNITED STATES PATENTS

| Number | Name | Date |
|---|---|---|
| 1,393,134 | Johnson | Oct. 11, 1921 |
| 1,837,396 | Barbieri | Dec. 22, 1931 |
| 2,180,954 | Harrison | Nov. 21, 1939 |
| 2,244,282 | Bergstein | June 3, 1941 |
| 2,249,202 | Ferguson | July 15, 1941 |
| 2,280,773 | Ferguson | Apr. 28, 1942 |
| 2,324,068 | Crandell | July 13, 1943 |
| 2,399,250 | Peters | Apr. 30, 1946 |
| 2,399,934 | Monroe | May 7, 1946 |
| 2,409,460 | Waters | Oct. 15, 1946 |
| 2,467,930 | Coyle | Apr. 19, 1949 |